(12) United States Patent
Ochiai et al.

(10) Patent No.: US 6,897,909 B2
(45) Date of Patent: May 24, 2005

(54) LIQUID CRYSTAL DISPLAY DEVICE

(75) Inventors: Takahiro Ochiai, Mobara (JP);
Ryutaro Oke, Mobara (JP); Hirotaka Imayama, Mobara (JP); Kikuo Ono, Mobara (JP)

(73) Assignee: Hitachi, Ltd., Tokyo (JP)

( * ) Notice: Subject to any disclaimer, the term of this patent is extended or adjusted under 35 U.S.C. 154(b) by 261 days.

(21) Appl. No.: 10/216,396

(22) Filed: Aug. 12, 2002

(65) Prior Publication Data
US 2003/0090599 A1 May 15, 2003

(30) Foreign Application Priority Data
Nov. 15, 2001 (JP) ........................................ 2001-349571

(51) Int. Cl.[7] .............................................. G02F 1/136
(52) U.S. Cl. ............................ 349/43; 349/39; 349/140
(58) Field of Search .......................... 349/38, 39, 140, 349/43; 345/87, 96; 257/59, 72

(56) References Cited

U.S. PATENT DOCUMENTS

| | | | |
|---|---|---|---|
| 5,734,455 A | 3/1998 | Yoshida et al. | |
| 5,986,723 A | 11/1999 | Nakamura et al. | |
| 6,088,071 A | 7/2000 | Yamamoto et al. | |
| 6,246,453 B1 | 6/2001 | Zhang et al. | |
| 6,259,502 B1 | 7/2001 | Komatsu | |
| 6,359,665 B1 * | 3/2002 | Matsushima | 349/38 |
| 6,587,163 B1 * | 7/2003 | Nakayama et al. | 349/43 |
| 6,614,053 B1 * | 9/2003 | Takenaka | 257/66 |
| 6,633,360 B2 * | 10/2003 | Okada et al. | 349/145 |

FOREIGN PATENT DOCUMENTS

| | | |
|---|---|---|
| JP | 01-129234 | 11/1987 |
| JP | 07-036058 | 7/1993 |
| JP | 07-244296 | 3/1994 |

* cited by examiner

Primary Examiner—Kenneth Parker
Assistant Examiner—David Y. Chung
(74) Attorney, Agent, or Firm—Reed Smith LLP; Stanley P. Fisher, Esq.; Juan Carlos A. Marquez, Esq.

(57) ABSTRACT

In a liquid crystal display device, a capacitance element uses a semiconductor layer as one electrode and is formed between the semiconductor layer and a storage capacitance line with an insulating film interposed therebetween, and a voltage which constantly brings a MOS type transistor into an ON state is applied to the storage capacitance line.

15 Claims, 11 Drawing Sheets

Voltage difference between Vd and Vds

LIQUID CRYSTAL DISPLAY DEVICE

BACKGROUND OF THE INVENTION

1. Field of the Invention

The present invention relates to a liquid crystal display device and, more particularly, to an active matrix type liquid crystal display device of a thin film transistor (TFT) type or the like.

2. Description of the Related Art

Liquid crystal display devices, because of their features such as thin size, light weight and low power consumption, are widely used as display devices for image information and character information in information equipment represented by personal computers, mobile types of information terminals, mobile telephones, and visual equipment such as digital cameras and camera-integrated type VTRs. In recent years, the fusion of personal computers and video digital media has proceeded owing to the appearance of DVDs, the popularization of large capacity media resulting from the rapid evolution of large-capacity magnetic disk drives, and the start of BS digital broadcasting, so that demands for display devices of higher image quality capable of coping with such uses have been stronger and stronger. Since these display devices also premise uses in TVs, it has been demanded that such display devices have brighter screen displays. Accordingly, backlights (BL) to be used in the display devices are becoming brighter and brighter.

In the field of liquid crystal display devices for use in applications of high image quality, two kinds of modes are mainly used: a vertical electric field mode in which an electric field is applied in the vertical direction of a substrate, as represented by an TN type and an MVA type; and a lateral electric fieldmode in which an electric field is applied in the horizontal direction of a substrate, i.e., a so-called in-plane-switching (IPS) mode.

In the IPS mode of liquid crystal display device, it is general practice to use a storage capacitance formed of an insulating film between a pixel electrode and a counter electrode on a substrate on which TFTs are formed, as disclosed in Japanese Patent Laid Open No. H07-36058.

In the vertical electric field mode of liquid crystal display device as well, it is known that a storage capacitance is formed of an insulating film between a pixel electrode and a storage capacitance signal line on a substrate on which TFTs are formed.

SUMMARY OF THE INVENTION

In such a liquid crystal display device, as the amount of light of the BL increases, the intensity of irradiating light from the BL increases and the OFF currents of TFTs increase during irradiation with light. This fact results in the problem that a larger storage capacitance is needed for stabilization of the operation of the TFTs.

The present inventors have examined the utilization of a semiconductor layer for the purpose of forming a large storage capacitance. Japanese Patent Laid Open No. H01-129234 discloses a structure in which a semiconductor layer is used to form a storage capacitance. However, the present inventors have found out that if a stacked structure made of an insulating film and a semiconductor layer is used as a storage capacitance, the potential difference between a pixel electrode and a counter electrode becomes AC voltage and causes the problem that the semiconductor layer is switched on and off during a storage period and storage potential can not be stabilized. On the other hand, Japanese Patent Laid Open No. H07-244296 discloses a method of using a semiconductor layer as a storage capacitance in such a way as to adjust bias to use the semiconductor layer constantly in an OFF state. However, in this method, it has been found out that during the state in which the amount of light from the backlight BL increases and intense light strikes the semiconductor layer, the OFF state becomes unstable and the storage potential of the storage capacitance is affected.

Furthermore, the present inventors have found out the following new problem. In a case where TFTs made of low-temperature polysilicon are formed on the TFT glass substrate of a liquid crystal display device and a scanning circuit which drives a screen is built in the liquid crystal display device, an insulating film which can form a thinnest and hence largest storage capacitance is a gate insulating film. In a structure in which a gate insulating film overlies a so-called planar type of semiconductor layer and a gate electrode is formed on the insulating film, so-called poly-crystalline silicon of the channel region of a TFT underlies the insulating film. In this structure, it has been found out that if a storage capacitance is formed by using the semiconductor layer, far more extreme potential variations occur owing to the gate, source and drain voltages of the TFT. Namely, only when the TFT is in an ON state, a large storage capacitance determined by the thickness of the gate insulating film can be formed. Accordingly, a large capacitance variation occurs in the storage capacitance according to the state of driving, so that storage potential cannot be stabilized. Furthermore, since the TFT is of a MOS type which uses electrons or holes in one polarity, a capacitance value varies even with polarity during a storage period. A difference in capacitance value also occurs according to the kind of TFT, i.e., whether an n type or a p type. Furthermore, the present inventors have found out that in polysilicon having large mobility, the difference in mobility between electrons and holes becomes larger than in amorphous silicon, so that far larger capacitance variations occur in the storage capacitance and the storage potential cannot be stabilized.

Furthermore, the present inventors have found out that in the case of an IPS type liquid crystal display device, if a pixel electrode and a common electrode are used as electrodes for a storage capacitance, pixel electrode potential and common electrode potential needs to be driven so that they are periodically inverted in polarity, and if a semiconductor layer is used as a constituent element of a storage capacitance constitution, a large storage variation occurs in the storage capacitance owing to driving and storage potential cannot be stabilized.

Furthermore, in the case of the IPS type liquid crystal display device, in a planar type of TFT structure, the pixel electrode and the common electrode are disposed above the gate insulating film, and if the pixel electrode and the common electrode are used as the electrodes for the storage capacitance, it becomes impossible to use the gate insulating film as the insulating film for the storage capacitance. This leads to the problem that no large storage capacitance can be formed.

Furthermore, in the case of the IPS liquid crystal display device, there is the problem that when a potential other than the common electrode potential and the pixel electrode potential is applied to an optically transmissive portion of liquid crystal, visual display is disturbed by the potential. There is also the problem that if a large storage capacitance is formed, the distance between electrodes or lines is shortened in the same plane and short-circuit failures increase between the electrodes or the lines. Further, there is the problem that the formation of a large storage capacitance decreases an aperture ratio and lowers the brightness of the liquid crystal display device.

Advantages of this invention is enable to solve or improve of one or a plurality of the above-described problems. One advantage realize by either one of this invention is to provide a liquid crystal display device which realizes large storage capacitances stable in storage potential and can realize stable visual display even if the luminance of a backlight is high.

Another advantage realize by either one of this invention is to provide a TFT liquid crystal display device in which an increase storage capacitances in an IPS type of liquid crystal display device which uses low-temperature polysilicon TFTs as pixel TFTs.

Another advantage realize by either one of this invention is to provide a TFT liquid crystal display device in which in the case where large storage capacitances are provided, no potential other than pixel electrode potential and common electrode potential is applied to a main optically transmissive portion of liquid crystal, whereby it is possible to provide stable visual display in IPS type of liquid crystal display device.

Another advantage realize by either one of this invention is to provide a TFT liquid crystal display device in which a reduction in short-circuit fraction defective between the electrodes can be prevented even if large storage capacitances are formed.

Another advantage realize by either one of this invention is to provide a bright TFT liquid crystal display device in which the aperture ratio can be height ened even if large storage capacitances are formed.

Examples of the invention will be described.

(1) A liquid crystal display device includes a liquid crystal layer clamped between a first transparent substrate and a second transparent substrate, a plurality of gate lines provided on the first transparent substrate, a plurality of drain lines disposed to intersect the plurality of gate lines in matrix form on the first transparent substrate, pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected by the TFT element in accordance with a signal from one of the gate lines and is electrically supplied, a semiconductor layer forming the TFT element, and a capacitance line forming a capacitance element with an insulating layer interposed between the semiconductor layer and the capacitance line, a potential difference of polarity capable of bringing the semiconductor layer into a conductive state being approximately constantly applied between the semiconductor layer and the capacitance line.

(2) A liquid crystal display device includes a liquid crystal layer clamped between a first transparent substrate and a second transparent substrate, a plurality of gate lines provided on the first transparent substrate, a plurality of drain lines disposed to intersect the plurality of gate lines in matrix form on the first transparent substrate, pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected by the TFT element in accordance with a signal from one of the gate lines and is electrically supplied, a semiconductor layer formed integrally with the TFT element, and a capacitance line forming a capacitance element with an insulating layer interposed between the semiconductor layer and the capacitance line, the semiconductor layer formed integrally with the TFT element being electrically connected to the pixel electrode on a side of a gate electrode of the TFT element which side is opposite to a side where the drain line is formed, a potential difference to bring the semiconductor layer into a conductive state being approximately constantly applied to the capacitance line.

(3) A liquid crystal display device includes a liquid crystal layer clamped between a first transparent substrate and a second transparent substrate, a plurality of gate lines provided on the first transparent substrate, a plurality of drain lines disposed to intersect the plurality of gate lines in matrix form on the first transparent substrate, pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected by the TFT element in accordance with a signal from one of the gate lines and is electrically supplied, the pixel electrode being formed of two layers which are a metal material layer and a transparent conductive layer, a semiconductor layer formed integrally with the TFT element, and a capacitance line forming a capacitance element with an insulating layer interposed between the semiconductor layer and the capacitance line, the semiconductor layer being connected to the metal layer of the pixel electrode via a through-hole provided in the insulating layer, the metal layer of the pixel electrode being connected to the transparent conductive layer of the pixel electrode via a through hole provided in another insulating layer, a potential difference to being the semiconductor layer into a conductive state being approximately constantly applied to the capacitance line.

(4) A liquid crystal display device as in any of (1) to (3) further includes a common signal line on the first transparent substrate, the common signal line and the pixel electrode having portions superposed in plan view, the common signal line and the capacitance line differing in potential from each other.

(5) A liquid crystal display device as in any of (1) to (4) further includes a common electrode on the first transparent substrate, the common electrode being spaced apart from the pixel electrode, the liquid crystal layer being driven by electric fields having components formed in a direction parallel to the first transparent substrate between the common electrode and the pixel electrode.

(6) In any of (1) to (5), the insulating film between the semiconductor layer and the capacitance line is thinner in film thickness than any insulating film in contact with the pixel electrode.

(7) In (6), the insulating film between the semiconductor layer and the capacitance line is made of $SiO_2$.

(8) In any of (1) to (7), the capacitance line has the same potential as an ON potential of the gate line.

(9) In any of (1) to (7), the capacitance line has a potential not smaller than a value obtained by adding a threshold voltage of the TFT to a maximum voltage of the drain line.

(10) In any of (1) to (7), a shielding electrode is formed to be superposed on the capacitance line in plan view with an insulating film interposed therebetween.

(11) In (10), the shielding electrode is one of the common electrode and the common electrode line.

(12) In any of (1) to (11), the semiconductor layer is made of polysilicon.

(13) In (12), the semiconductor layer is formed of one of a p-TFT and an n-TFT and is of the same type as a TFT provided outside a pixel area.

(14) A liquid crystal display device as in any of (1) to (12) further includes a backlight unit provided on a back surface of the first transparent substrate.

(15) In (14), the backlight unit has a luminance of not smaller than 8,000 cd/cm$^2$.

(16) A liquid crystal display device includes a liquid crystal layer clamped between a first transparent substrate and a second transparent substrate, a plurality of gate lines provided on the first transparent substrate, a plurality of drain lines disposed to intersect the plurality of gate lines in matrix form on the first transparent substrate, and pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected by the TFT element in accordance with a signal from one of the gate lines and is electrically supplied, each of the pixels having a common electrode line being connected to plural ones of the pixels to give a reference voltage to the plural ones, and a common electrode connected to the common electrode line, liquid crystal molecules of the liquid crystal layer being driven by lateral electric fields having components formed in a direction parallel to the first transparent substrate between the common electrode and the pixel electrode, each of the pixels having a storage capacitance electrode or a storage capacitance line different from the common electrode and the common electrode line, a storage capacitance being formed between the storage capacitance electrode or the storage capacitance line and a storage capacitance member connected to a potential of the pixel electrode.

(17) In (16), the storage capacitance has one electrode made of the storage capacitance electrode or the storage capacitance line, another electrode made of the storage capacitance member using a semiconductor film forming a thin film transistor, and a gate insulating film between the storage capacitance electrode or the storage capacitance line and the storage capacitance member.

(18) In (16) or (17), the semiconductor film forming the thin film transistor is a polysilicon film.

(19) In (17) and (18), the semiconductor film functions as the another electrode forming the storage capacitance, by being lowered in resistivity when a voltage is applied to the storage capacitance electrode or the storage capacitance line and electrons or holes are induced at an interface between the semiconductor film and the gate insulating film.

(20) In (16), the common electrode or the common electrode line is superposed on the storage capacitance electrode or the storage capacitance line with an insulating film interposed therebetween.

(21) In (20), the common electrode or the common electrode line is connected to a second common electrode line disposed in parallel with the gate line, at an opening in the insulating film.

(22) In (20), the storage capacitance electrode or the storage capacitance line is covered with the insulating film on the first transparent substrate on which the thin film transistor is formed, and is electrically shielded by the common electrode or the common electrode line and the pixel electrode which overlie the insulating film.

(23) In (22), a first insulating film, the pixel electrode, a second insulating film and the common electrode are stacked in named order on the storage capacitance electrode or the storage capacitance line, the pixel electrode and the common electrode being structured to overlap each other with the second insulating film interposed therebetween.

(24) In (22), the pixel electrode and the common electrode which cover the storage capacitance electrode or the storage capacitance line overlap each other in a sawtooth-like form in plane pattern.

(25) A liquid crystal display device of an IPS type includes, in an area which forms one pixel on a transparent substrate on which TFTs are formed, a stacked structure made of a semiconductor and a gate insulating film which form a storage capacitance different from any of a gate electrode and a gate line which drive a TFT for supplying a pixel potential to a liquid crystal, a drain electrode and a drain line which supply a video potential, and a common electrode and a common electrode line which supply a common potential, the semiconductor layer of the stacked structure being constantly placed in an ON state, the storage capacitance including another storage capacitance electrode or storage capacitance line which is different from any of the gate line, the common electrode line and the drain line and is provided over the semiconductor layer with the gate insulating film interposed therebetween.

(26) In (25), in a case where the pixel TFT has an n-type MOS structure, a potential of the storage capacitance line is made a voltage which is not smaller than a value obtained by adding a threshold voltage of the pixel TFT to a maximum voltage to be applied to the drain line.

(27) In (25), in a case where the pixel TFT has an n-type MOS structure, a maximum voltage to be applied to the gate line is made at least three times a time period for which the TFT pixel is selected, or a DC voltage is applied.

(28) In (25), in a case where the pixel TFT has a p-type MOS structure, a potential of the storage capacitance line is made a voltage which is not greater than a value obtained by subtracting a threshold voltage of the pixel TFT from a minimum voltage to be applied to the drain line.

(29) In (25), in a case where the pixel TFT has a p-type MOS structure, a minimum voltage to be applied to the gate line is made at least three times a time period for which the TFT pixel is selected, or a DC voltage is applied.

(30) In any of (25) to (29), the storage capacitance line has an electrically shielded structure in which the common electrode or the common electrode line is superposed on the storage capacitance line in plan view with another insulating film interposed therebetween.

(31) In any of (25) to (30), the common electrode line in the same layer as the gate line is eliminated, and an insulating film of low dielectric constant is formed over the above-descried lines and the pixel TFT, and the common electrode overlying the insulating film is made low in resistance.

(32) In any of (25) to (31), the storage capacitance line has an electrically shielded structure in which the common electrode or the common electrode line and the pixel electrode are disposed to overlap alternately one above another to cover the storage capacitance line.

(33) A liquid crystal display device includes a liquid crystal layer clamped between a first transparent substrate and a second transparent substrate, a plurality of gate lines provided on the first transparent substrate, a plurality of drain lines disposed to intersect the plurality of gate lines in matrix form on the first transparent substrate, thin film transistors respectively formed to correspond to intersections of the plurality of gate lines and the plurality of drain lines, and pixels respectively formed by areas each surrounded by adjacent ones of the plurality of gate lines and adjacent ones of the plurality of drain lines, each of the pixels having a common electrode line connected to plural ones of the pixels to give a reference voltage thereto, a common electrode connected to the common electrode line, and a pixel electrode connected to a corresponding one of the thin film transistors and disposed in opposition to the common electrode, liquid crystal molecules of the liquid crystal layer being driven by lateral electric fields having components formed in a direction parallel to the first transparent substrate between the common electrode and the pixel electrode, each of the pixels having a storage capacitance electrode or a storage capacitance line different from the common electrode and the common electrode line, a storage capacitance being formed between the storage capacitance electrode or the storage capacitance line and a storage capacitance member connected to a potential of the pixel electrode, the storage capacitance line and the gate line being disposed approximately in parallel with each other, an end portion of the gate line being electrically shielded by being covered with an insulating film and further with the common electrode or the common electrode line over the insulating film, and a bottom side of the end portion of the gate line being electrically shielded by a semiconductor layer of polysilicon with another insulating film interposed therebetween.

Further features and advantages of the invention will become apparent from the detailed description given hereinafter.

DETAILED DESCRIPTION

Preferred embodiments of the invention will be described below in detail.

(Embodiment 1)

Figure 1:
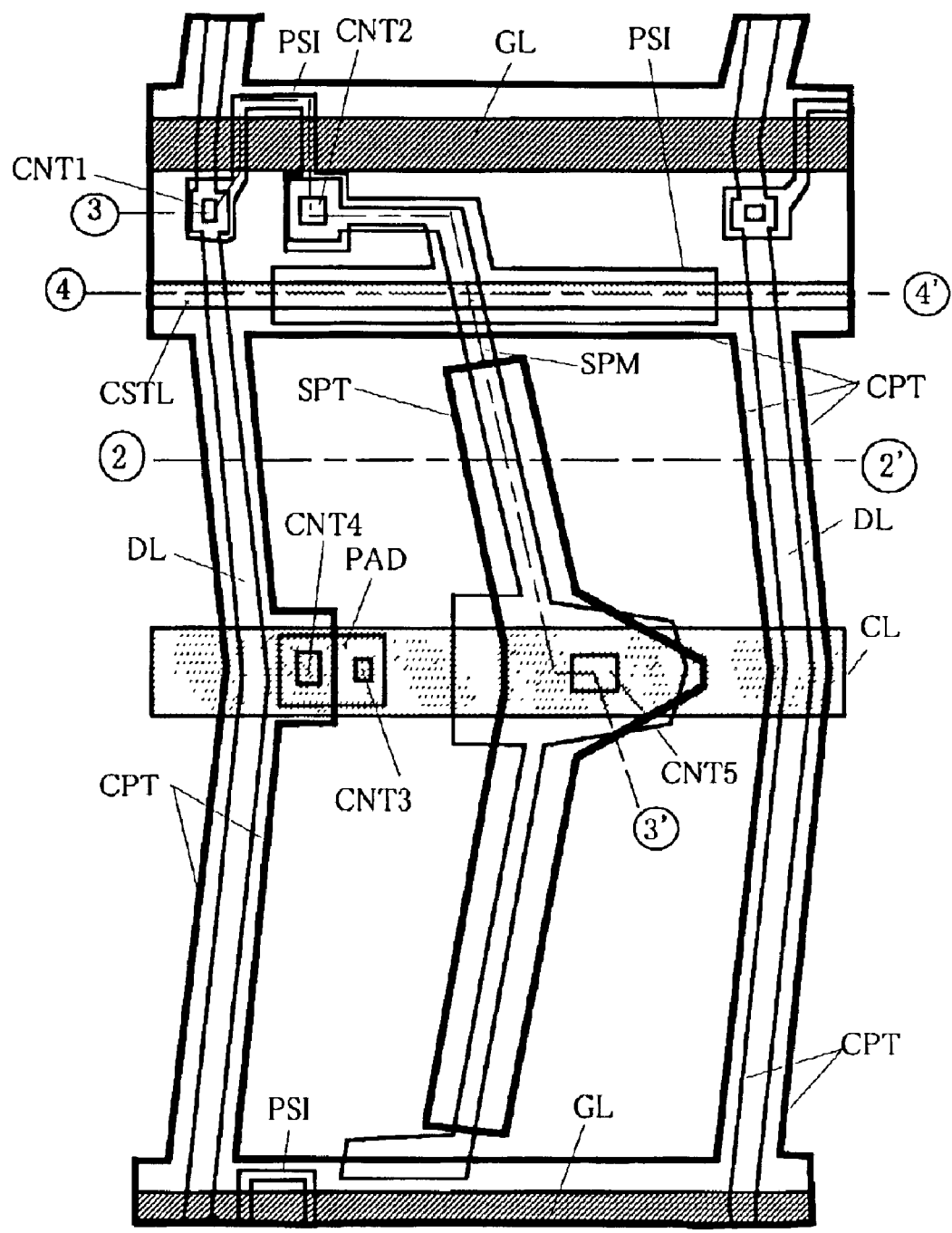
FIG. 1 is a diagrammatic plan view of a unit pixel of a TFT liquid crystal display device according to one embodiment of the invention.
Figure 2:
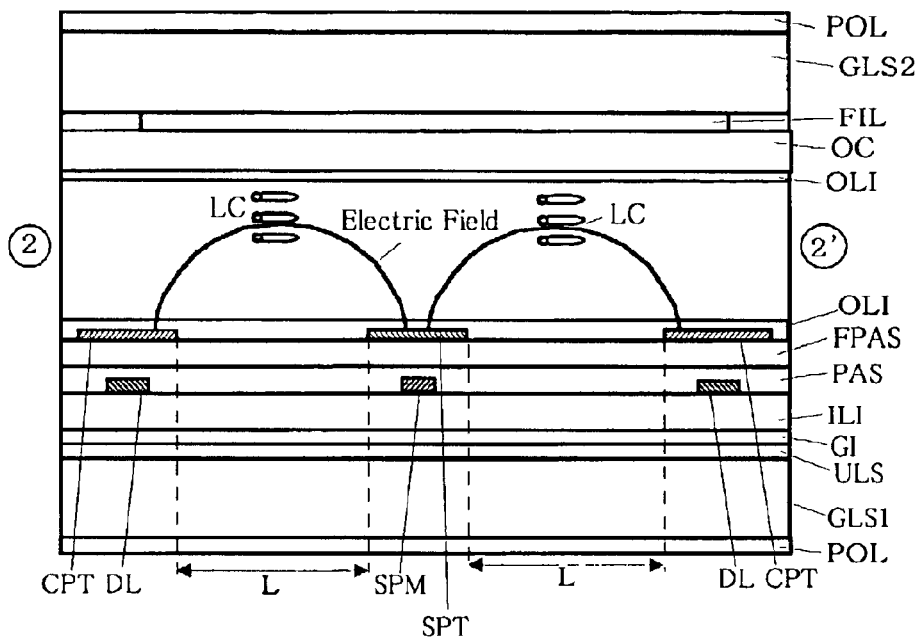
FIG. 2 is a diagrammatic cross-sectional view taken along cutting line 2–2' of FIG. 1.
Figure 3:
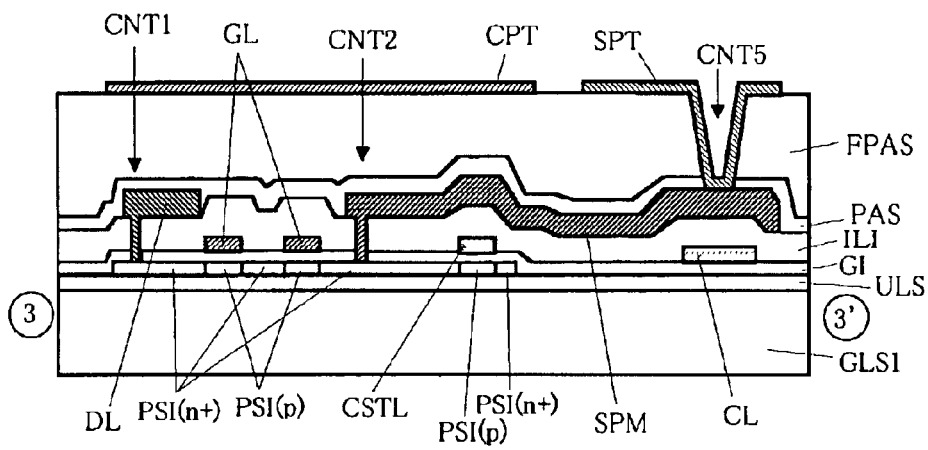
FIG. 3 is a diagrammatic cross-sectional view taken along cutting line 3–3' of FIG. 1.
Figure 4:
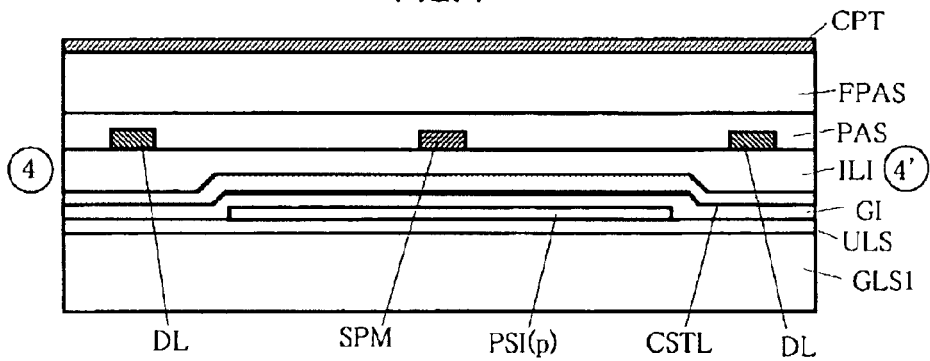
FIG. 4 is a diagrammatic cross-sectional view taken along cutting line 4–4' of FIG. 1.

FIG. 1 is a diagrammatic plan view of a unit pixel of a liquid crystal display device according to Embodiment 1. FIGS. 2, 3 and 4 are diagrammatic cross-sectional views respectively taken along lines 2–2', 3–3' and 4–4' of FIG. 1 (in FIG. 1, these numerals are encircled for ease of understanding).

In the plane pattern shown in FIG. 1, one pixel is an area surrounded by adjacent gate lines GL and adjacent drain lines DL. A gate line GL (shown in the upper portion of FIG. 1) also functions as a gate electrode of a TFT made of polysilicon PSI at the intersection of the gate line GL and the polysilicon PSI, and supplies a voltage to turn on/off the TFT. A drain line DL (shown in the left portion of FIG. 1) supplies a current to the polysilicon PSI. Specifically, the drain line DL supplies to a liquid crystal capacitance of the one pixel a video voltage (drain voltage) applied at the timing when the gate line GL supplies an ON voltage to the TFT, and the potentials of a metal pixel electrode SPM and a transparent pixel electrode SPT connected thereto finally become a video potential. In the following description, description and consideration as to factors such as externally introduced voltages are omitted.

A current passage corresponding to the video voltage in the plan view of FIG. 1 leads from the drain line DL to the polysilicon PSI through a first contact hole CNT1, and the current in the polysilicon PSI flows into the metal pixel electrode SPM through a second contact hole CNT2. Further, the current flows from the metal pixel electrode SPM to the transparent pixel electrode SPT on an insulating film via a fifth contact hole CNT5.

The common electrode potential of an electrode CPT for forming a lateral electric field together with the transparent pixel electrode SPT is applied through the following passage. First, a common potential is applied to a common electrode line CL disposed approximately in the middle between the adjacent gate lines GL. This potential is set to an approximately mid-point potential of a pixel potential to be AC-driven every frame (a detailed description will be given later in connection with FIG. 5). The potential of the common electrode line CL is coupled to an electrode pad PAD via a third contact hole CNT3. The electrode pad PAD finally supplies a potential via the overlying insulating film to the transparent common electrode CPT which covers the drain line DL and the gate line GL.

A characteristic structure of the invention is such that a special storage capacitance is formed as a parallel equivalent circuit of the liquid crystal capacitance so that the potential of the liquid crystal capacitance associated with video display is prevented from being attenuated during display, i.e., a storage period, by light from a backlight (BL) via the TFT formed of the polysilicon PSI. The special storage capacitance is constructed to use a storage capacitance line CSTL and the semiconductor layer PSI as its electrodes, and use a gate insulating film as a dielectric film of the storage capacitance between the electrodes. As shown in FIG. 1, the storage capacitance line CSTL is disposed independently of the gate line GL and the common electrode line CL. Since the semiconductor layer PSI and the metal pixel electrode SPM are electrically connected by the second contact hole CNT2, the storage capacitance is constituted between the potential of the metal pixel electrode SPM and the potential of the storage capacitance line CSTL. In FIG. 1, since the metal pixel electrode SPM extends to traverse the storage capacitance line CSTL, a further capacitance is formed at the intersection, whereby a further increase in the storage capacitance is realized.

As shown in FIG. 1, in the IPS type of liquid crystal display device, it is desirable that the storage capacitance line CSTL be electrically shielded by being covered with the transparent common electrode CPT so that display can be prevented from being disturbed when an electric field leaking from the storage capacitance line CSTL is applied to liquid crystal. This transparent common electrode CPT also covers the drain line DL, and in Embodiment 1, further covers the gate line GL. Accordingly, although three kinds of lines, i.e., the gate line GL, the drain line DL and the storage capacitance line CSTL, are disposed below the transparent common electrode CPT and electric fields are formed, influence on the liquid crystal can be prevented.

The constructions of individual portions will be described below in detail with reference to the cross-sectional views of FIGS. 2 to 4.

FIG. 2 is a cross-sectional view taken along cutting line 2–2' of FIG. 1, and shows a portion which traverses one pixel area between the adjacent drain lines DL. Description is started with the area of the side 2. A base insulating film ULS which is made of a $Si_3N_4$ film of thickness 50 nm and a $SiO_2$ film of thickness 120 nm is formed on a non-alkali TFT glass substrate GLS1 having a strain point of about 670° C. The base insulating film ULS has the role of preventing diffusion of impurities such as Na from the TFT glass substrate GLS1. A gate insulating film GI made of an $SiO_2$ film, which serves as the gate insulating film of the TFT, is formed on the base insulating film ULS. An interlayer insulating film ILI made of $SiO_2$ is formed on the gate insulating film GI. Formed on the interlayer insulating film ILI are the drain line DL and the metal pixel electrode SPM. The drain line DL is made of a three-layer metal film of Ti/Al/Ti, and the metal pixel electrode SPM is a metal electrode formed in the same process and of the same material as the drain line DL, and is connected to the semiconductor layer PSI through the second contact hole CNT2 in the plan view of FIG. 1.

All of these elements are covered with a protective insulating film PAS made of $Si_3N_4$ of thickness 200 nm and an organic protective film FPAS of thickness 2 μm which essentially contains an acrylic resin. The transparent common electrode CPT which is wider than the drain line DL is formed on the organic protective film FPAS. In Embodiment 1, the transparent common electrode CPT uses Indium-Tin-Oxide (ITO), but may also use Indium-Zinc-Oxide (IZO), Indium-Tin-Zinc-Oxide (ITZO) or the like. The transparent pixel electrode SPT made of ITO, which is formed in the same process and of the same material as the transparent common electrode CPT is also formed on the organic protective film FPAS. The transparent pixel electrode SPT and the metal pixel electrode SPM are connected via the fifth contact hole CNT5 shown in FIG. 1.

An optically transmissive area used for display purpose mainly lies between the transparent common electrode CPT on the drain line DL and the transparent pixel electrode SPT, and portions from ends of the transparent electrode also contributes to the optically transmissive area. The portion between the adjacent drain lines DL is divided into two optically transmissive areas by the transparent pixel electrode SPT.

The IPS type of liquid crystal display device is constructed to drive a liquid crystal LC by lateral electric fields applied to the liquid crystal LC between the transparent pixel electrode SPT and the transparent common electrode CPT, thereby controlling light being transmitted through the liquid crystal LC. Accordingly, even if the transparent pixel electrode SPT and the transparent common electrode CPT are formed of a transparent electrode made of ITO or the like, it is difficult to form all the areas on the transparent electrodes into optically transmissive areas, but part of the areas can be used as an optically transmissive area. As one example, in the case of a positive liquid crystal material, an area 1.5 μm inward from each end of a transparent electrode on an electrode can be used as an optically transmissive area, while in the case of a negative liquid crystal material, an area 3 μm inward from each end of a transparent electrode on an electrode can be used as an optically transmissive area.

A substrate which is disposed on the side opposite to the TFT glass substrate GLS1 to seal the liquid crystal LC is a color filter (CF) substrate GLS2. The color filter substrate GLS2 has, on its liquid-crystal side, color filter elements FIL made of an organic film material in which are dispersed pigments for providing color display, and each of the color filter elements FIL is a color filter which represents transmitted light of blue (B), red (R) or green (G) according to a color assigned to each pixel (for example, a color filter for red is denoted by FIL(R)). An overcoat film OC made of an organic material may also be formed on the inside surfaces of the color filters CF, because the overcoat film OC can improve the effect of prevention of contamination from the color filters CF as well as the flatness of the color filters CF. Alignment films OLI are respectively printed on the surfaces of the color filter substrate GLS2 and the TFT glass substrate GLS1 that are in contact with the liquid crystal LC, thereby applying predetermined rubbing to control initial alignment. Polarizers POL are respectively stuck to the outside surfaces of the color filter substrate GLS2 and the TFT glass substrate GLS1. These polarizers POL are arranged in a so-called crossed-Nicols state in which their polarizing axes are perpendicular to each other.

FIG. 3 is a cross-sectional view taken along cutting line 3–3' of FIG. 1. More specifically, FIG. 3 shows a cross-sectional view taken along a transversal line which, as viewed in the plan view of FIG. 1, passes through a part of the drain line DL, the first contact hole CNT1, the polysilicon layer PSI of the TFT and the second contact hole CNT2, further through the storage capacitance line CSTL disposed in parallel with the gate line GL, further through the metal pixel electrode SPM, and reaches the fifth contact hole CNT5 above the common electrode line CL disposed in parallel with the gate line GL and the storage capacitance line CSTL.

The left-hand side of the cross-sectional view of FIG. 3 is a cross-section of the so-called TFT. The TFT is a so-called MOS TFT which uses the drain line DL and the metal pixel electrode SPM as so-called drain and source electrodes and the gate line GL as a gate electrode, and has the gate insulating film GI. The drain line DL and the metal pixel electrode SPM are connected to a high-concentration n-type layer PSI($n^+$) doped with phosphorus as an impurity in the low-temperature polysilicon PSI, through the first contact hole CNT1 and the second contact hole CNT2 formed in the gate insulating film GI and the interlayer insulating film ILI. The high-concentration region PSI($n^+$), although it is made of polysilicon, can be regarded as a conductive layer rather than a semiconductor because its conductivity is constantly comparatively high. For this reason, the polysilicon layer PSI can be regarded as a conductive layer except a portion below the gate line GL. On the other hand, a p-type layer PSI(p) doped with boron as an impurity below the gate line GL is in a semiconductive state which exhibits a switching operation in response to gate voltage. When an ON voltage is applied to the gate line GL, the potential at the interface between the p-type layer PSI(p) and the gate insulating film GI is inverted to form a channel region, whereby an ON current flows in the TFT and a current is allowed to flow into the metal pixel electrode SPM, thereby charging the liquid crystal capacitance. A TFT in which the drain line DL and the metal pixel electrode SPM are in contact with an n-type polysilicon layer PSI is called an n-type MOS or an n-type TFT. Contrarily, a TFT in which the connection portions of the polysilicon layer PSI are a high-concentration p-type semiconductor layer doped with boron is called a p-type MOS or a p-type TFT.

The central portion of the cross-sectional view of FIG. 4 is a cross-sectional view of a portion which constitutes the special storage capacitance. The storage capacitance line CSTL made of Mo or MoW is formed in the same process as the gate line GL, and a power source voltage separate from that of the gate line GL is applied to the storage capacitance line CSTL. The gate insulating film GI is disposed below the storage capacitance line CSTL. Basically, the cross-sectional structure of this storage portion is formed as a TFT-like structure. Accordingly, when an ON voltage is applied to the gate line GL, a semiconductor layer close to the interface between the p-type semiconductor layer PSI(p) of the channel region and the gate insulating film GI is inverted to allow an ON current to flow. During this time, if a voltage not smaller than the ON voltage is also applied to the storage capacitance line CSTL, the special storage portion can be formed as a capacitance which uses the gate insulating film GI as a dielectric film, the p-type polysilicon layer PSI(p) as one electrode and the storage capacitance line CSTL as another electrode. Namely, by adjusting the potential of the storage capacitance line CSTL to not lower than an ON potential at all times, it is possible to form a stable storage capacitance free from capacitance variations due to signal polarity. This is because the inversion of the polarity of a potential difference can be avoided unlike a case where a storage capacitance is formed between a pixel electrode potential and a common electrode potential.

In FIG. 3, the storage capacitance line CSTL is covered with the transparent common electrode CPT disposed on the protective film PAS and the organic protective film FPAS so that the potential of the storage capacitance line CSTL is prevented from being applied to the liquid crystal LC.

The transparent pixel electrode SPT for driving the liquid crystal LC is connected to the metal pixel electrode SPM via the fifth contact hole CNT5 provided in the protective film PAS and the organic protective film FPAS.

FIG. 4 is a cross-sectional view taken along cutting line 4–4' of FIG. 1. FIG. 4 is also a cross-sectional view taken along a transversal line of the storage capacitance line CSTL which mainly constitutes the storage capacitance. The storage capacitance is formed by using the storage capacitance line CSTL as its electrode and the gate insulating film GI as its dielectric, the storage capacitance line CSTL being formed in the same process and of the same material as the gate line GL and the polysilicon layer PSI which is wider than the storage capacitance line CSTL in the plane structure shown in FIG. 1. Furthermore, this storage capacitance line CSTL as well as the adjacent drain signal lines DL, i.e., a plurality of pixels, is completely covered with the transparent common electrode CPT formed on the organic protective film FPAS, whereby the potential of the storage capacitance line CSTL is shielded. Accordingly, the storage capacitance line CSTL has a structure which can form a large storage capacitance value, but does not allow the potential of the storage capacitance line CSTL to leak into the liquid crystal LC.

Figure 5A:
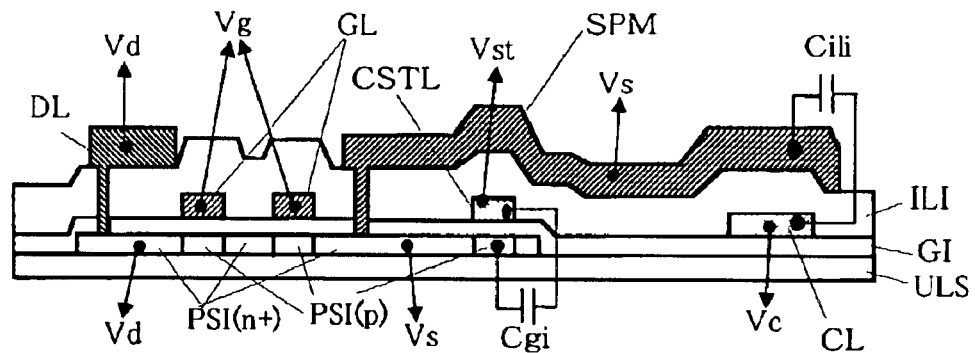
FIGS. 5A to 5C are respectively a cross-sectional view, a driving voltage waveform, and a characteristic chart which aid in explaining the structure and the electrical operation of a storage capacitance of the TFT liquid crystal display device according to the one embodiment of the invention.
Figure 5B:
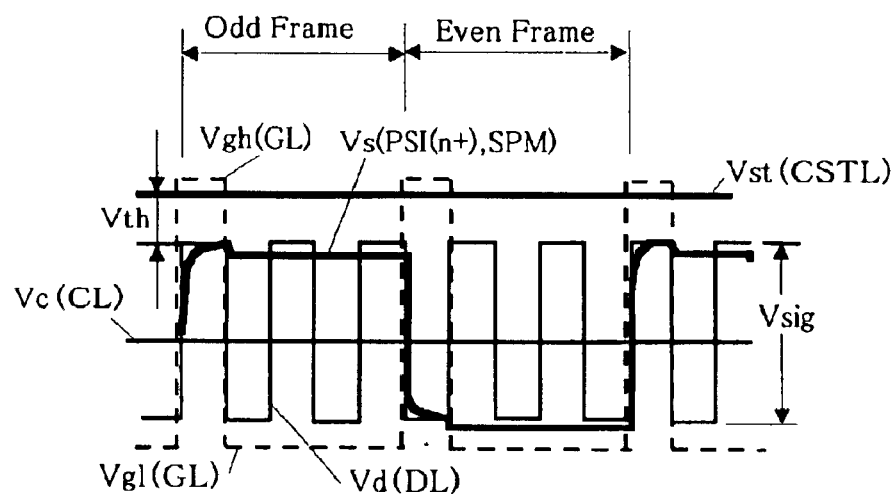
Figure 5C:
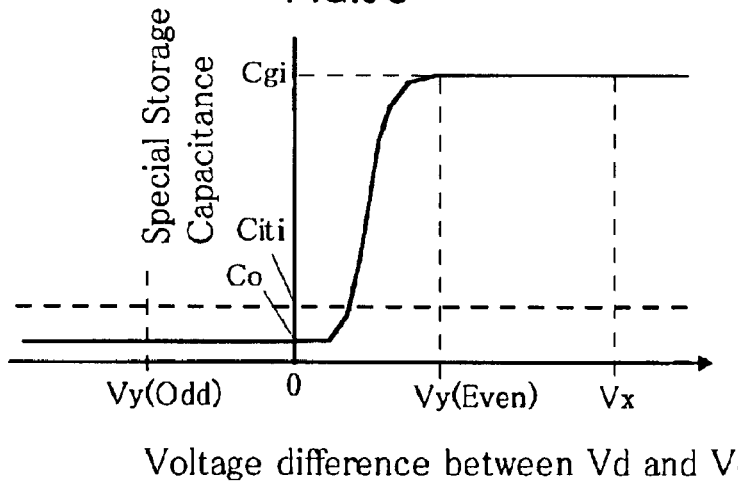

FIGS. 5A to 5C are views aiding in explaining the operation of the special storage capacitance of the invention. FIG. 5A is a view aiding in explaining the operation of the storage capacitance with reference to a part of the cross-sectional structure view of FIG. 3. FIG. 5B is a timing chart of driving voltages which are applied to the respective electrodes. FIG. 5C shows a voltage applied to the storage capacitance and a variation in the capacitance value thereof.

The operation of the special storage capacitance will be described along the time axis of the timing chart of the driving waveform shown in FIG. 5B. When a voltage Vgh, which is not lower than a value obtained by at least adding a threshold voltage Vth of the TFT to the maximum potential of a potential Vd of the drain line DL, is applied to the gate line GL of the TFT during an odd frame, the TFT is turned on and an n-type inversion layer is formed in the p-type polysilicon layer PSI (p) of the polysilicon layer PSI, whereby a source potential Vs approaches to basically the same potential as the drain potential Vd while charging the liquid crystal capacitance.

In the meantime, a voltage Vst of the storage capacitance line CSTL is set to not lower than a voltage obtained by at least adding the threshold voltage Vth of the TFT to the maximum potential of the potential Vd of the drain line DL. In this case, during the period in which the voltage Vgh is being applied to the TFT, the p-type polysilicon layer PSI(p) which constitutes the storage capacitance is inverted, whereby a storage capacitance value Cgi which uses the gate insulating film GI as a dielectric is obtained.

Furthermore, when a gate voltage Vg of the TFT is not selected, i.e., the gate voltage Vg becomes Vgl, the TFT of the pixel is turned of f and the pixel potential Vs is held until the gate voltage Vg is selected at the value Vgh. During this storage period as well, the potential Vst of the storage capacitance line CSTL is set to not lower than a value obtained by at least adding the threshold voltage Vth of the TFT to the maximum potential of the potential Vd of the drain line DL. Accordingly, the storage capacitance is maintained at the value Cgi which uses the gate insulating film GI as a dielectric. Needless to say, the area of intersection of the common electrode CPT or the common electrode line CL and the metal pixel electrode SPM also constitutes a storage capacitance Cili. However, the gate insulating film GI is ordinarily approximately 100 nm thick, whereas the interlayer insulating film ILI is set to thicker than the gate insulating film GI, for example, a value as thick as approximately 500 nm, so that the gate insulating film GI can retain the electrical insulation between the gate line GL and the storage capacitance line CSTL and the drain line DL or the metal pixel electrode SPM, all of which are made of metal layers of thickness 200 nm or more. Accordingly, the storage capacitance value which uses the gate insulating film GI as a dielectric can be formed as, for example, a five-fold storage capacitance value per unit area, whereby it is possible to reduce the area of an optically nontransmissive metal layer and increase an aperture ratio. Accordingly, it is possible to realize a bright liquid crystal display device. In addition, an extremely large storage capacitance value can be formed with respect to the same aperture ratio, and a decrease during a storage period in the liquid crystal capacitance potential due to an OFF current illuminated with light from below the TFT can be reduced, whereby it is possible to a liquid crystal display device which is stable in potential holding.

Accordingly, it is possible to realize a high-image-quality display even in a liquid crystal display device for TV in which a backlight of strong intensity is used.

FIG. 5C shows the relationship between the voltage applied to the storage capacitance line CSTL and the storage capacitance. For the sake of simplicity in description, the horizontal axis of FIG. 5C represents the voltage difference between the voltage Vd of the drain line DL and the voltage Vst of the storage capacitance line CSTL, and the right and left sides of FIG. 5C represent a plus region and a minus region, respectively. The vertical axis of FIG. 5C represents the special storage capacitance.

As is apparent from FIG. 5C, the value of the special storage capacitance greatly varies with potential difference. For this reason, in the invention, the potential of the storage capacitance line CSTL is constantly set to a potential Vx, i.e., a potential value higher than the maximum value of the drain potential Vd by the threshold voltage Vth, whereby the value of the special storage capacitance is constantly stabilized at a high value. The potential differences Vy (even) and Vy (odd) shown in FIG. 5C are comparative examples obtained in the case where the voltage Vst of the storage capacitance line CSTL is set to the same potential as a common voltage Vc of the common electrode line CL which is set to an approximately mid-point potential of the drain voltage Vd. During the odd frame, since the drain voltage Vd is greater than the potential Vst of the storage capacitance line CSTL, the potential difference becomes a minus value as shown by Vy (odd) in FIG. 5C, and the p-type polysilicon layer PSI(p) works as a dielectric without being inverted, so that the value of the special storage capacitance can only be obtained as a small parasitic capacitance value Co determined by the storage capacitance line CSTL and the geometrical shape of the n+type polysilicon layer PSI(n$^+$). On the other hand, during the even frame, the voltage Vst of the storage capacitance line CSTL is higher than the drain voltage Vd, and when a ½ voltage of an amplitude value Vsig of the drain voltage Vd is higher than the threshold voltage Vth of the TFT, the potential difference becomes as shown by, for example, Vy (even) in FIG. 5C, and the storage capacitance value becomes a value as large as Cgi. As a result, a special storage capacitance value Cstg greatly differs between the odd and even frames. For this reason, during the storage period, the pixel potential Vs becomes asymmetric and a DC voltage is applied to the liquid crystal LC, thus resulting in the problem that image retention and flickers which are produced by fluctuations in light on the screen occur in a displayed image. In other words, the storage capacitance having a stacked structure made of the insulating film and the semiconductor which is turned on/off at the common electrode potential cannot be used as the storage capacitance between the common electrode line CL and the metal pixel electrode SPM or the transparent pixel electrode SPT.

In the method of Embodiment 1, the storage capacitance is formed by bringing the polysilicon layer PSI into an ON state by means of the storage capacitance line CSTL. In other words, since a storage capacitance portion is originally used while being driven in an electrically conductive state, the method of Embodiment 1 has the remarkable advantage of leaks due to photoconduction in the storage capacitance portion can be solved in principle. Namely, the leaks become a problem in that electric charge leaks when the polysilicon layer PSI is in an OFF state, and so long as the polysilicon layer PSI is not brought into the OFF state, the leaks do not occur at all. Accordingly, not only a backlight having a high luminance exceeding 8,000 cd/m$^2$ but also a backlight having a very high luminance exceeding 10,000 cd/m$^2$ can be applied to the backlight BL, whereby it is possible to realize a liquid crystal display device which has high luminance and is bright and superior in storage characteristics.

As to the storage capacitance portion, it can be appreciated that since an increase of photocarriers due to an increase in light intensity rather contributes to the stabilization of the characteristics of the storage capacitance portion, the structure of the storage capacitance portion is optimum for luminance heightening.

The potential of the storage capacitance line CSTL may also be made the same as the ON potential of the gate line GL. This is because the storage capacitance line CSTL can use the same power source circuit and power supply line as the ON voltage of the gate line GL, so that a reduction in cost can be realized.

A manufacturing process of a TFT active matrix substrate to be used with liquid crystal display elements each made of only an n-type TFT as shown in FIG. 3 will be described below with reference to FIGS. 6 to 10 and FIG. 3 by way of example.

Figure 6:
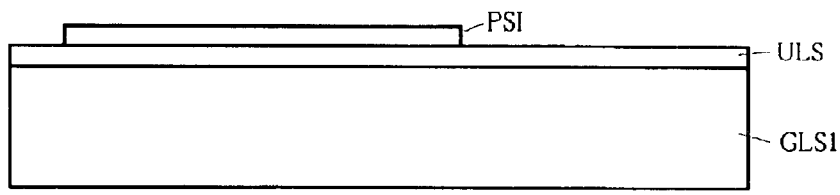
FIG. 6 is a diagrammatic cross-sectional view showing a first photo-process of the one embodiment of the invention.

First of all, a manufacturing method to be carried out until the completion of a first photo-process shown in FIG. 6 will be described below.

After a non-alkali TFT glass substrate GLS1 of thickness 0.7 mm, width 730 mm and width 920 mm as well as of strain point about 670° C. has been cleaned, a Si$_3$N$_4$ film of thickness 50 nm is formed on the gate signal lines GL by a plasma CVD method using a mixed gas of SiH$_4$, NH$_3$ and N$_2$. Then, a SiO$_2$ film of thickness 120 nm is stacked on the Si$_3$N$_4$ film by a plasma CVD method using a mixed gas of tetraethoxysilane and oxygen, thereby forming the base insulating film ULS. The base insulating film ULS is formed for the purpose of preventing diffusion of Na from the TFT glass substrate GLS1 into a polycrystalline silicon film. The forming temperature of the Si$_3$N$_4$ film and the SiO$_2$ film is 400° C.

Then, an approximately intrinsic amorphous silicon hydride film of thickness 50 nm is formed by a plasma CVD method using a mixed gas of $SiH_4$ and Ar. The temperature of the deposition was 400° C., and the amount of hydrogen immediately after the deposition was about 5 at %. Then, the TFT glass substrate GLS is annealed at 450° C. for about 30 minutes to emit hydrogen from the amorphous silicon hydride film. The amount of hydrogen after annealing was about 1 at %.

Then, the amorphous silicon film is irradiated with an excimer laser beam of wavelength 308 nm at a fluence of 400 mJ/cm$^2$ to melt and recrystallize the amorphous silicon film, thereby obtaining an approximately intrinsic polycrystalline silicon film PSI. At this time, the laser beam has a fine linear shape of width 0.3 mm and length 200 mm, and the amorphous silicon film is irradiated with the laser beam while the laser beam is being moved at a 10-$\mu$m pitch on the substrate GLS in a direction approximately perpendicular to the longitudinal direction of the laser beam. The irradiation was performed in a nitrogen atmosphere.

Then, a predetermined resist pattern is formed on the polycrystalline silicon film by an ordinary photolithography method, and the polycrystalline silicon film PSI is worked into a predetermined shape by a reactive ion etching method using a mixed gas of $CF_4$ and $O_2$.

Figure 7:
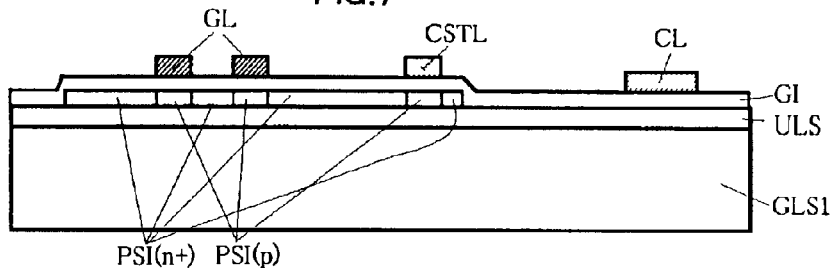
FIG. 7 is a diagrammatic cross-sectional view showing a second photo-process of the one embodiment of the invention.

A manufacturing method to be carried out until the completion of a second photo-process shown in FIG. 7 will be described below.

A $SiO_2$ film of thickness 100 nm is formed by a plasma CVD method using a mixed gas of tetraethoxysilane and oxygen, to obtain the gate insulating film GI. At this time, the mixture ratio of tetraethoxysilane and oxygen is 1:50, and the forming temperature is 400° C. After that, B ions are implanted by ion implantation with an acceleration voltage of 33 KeV and a dosage of 1E12 (cm$^{-2}$), to form the polysilicon film PSI(p) of the channel region of the n-type TFT. In this step, the entire polysilicon film is the polysilicon film PSI(p).

Then, after a Mo or MoW film of thickness 200 nm has been formed by a sputtering method, a predetermined resist pattern is formed on the Mo film by an ordinary photolithography method, and the Mo film is worked into a predetermined shape by a wet etching method using a mixed acid, to obtain the gate line GL, the storage capacitance line CSTL and the common electrode line CL.

P ions are implanted with the resist pattern used for etching being left, by ion implantation with an acceleration voltage of 60 KeV and a dosage of 1E15 (cm$^{-2}$), to form the source and drain regions PSI(n$^+$) of the n-type TFT. At this time, since the gate line GL and the resist serve as a stopper and P ions are not implanted into the polysilicon layer under the gate line GL, the polysilicon layer remains the p-type polysilicon layer PSI(p). On the other hand, since P ions are implanted into the polysilicon layer except regions underlying the resist and the gate line GL, the P-ion-implanted portion of the polysilicon layer becomes the source and drain regions PSI (n$^+$).

In the above-described manner, the n$^+$-type low-temperature polysilicon film PSI(n$^+$) for the source and drains of the n-type TFT and the polysilicon film PSI(p) for the p-type channel region are formed. However, in the following manner, an n-type LDD region which is lower in P ion concentration than the n$^+$-type film may be formed between the p-type film and the n$^+$-type film so that the leak current of the TFT can be reduced (not shown). Specifically, after the resist pattern used for etching has been removed, P ions are ions are again implanted by ion implantation with an acceleration voltage of 65 KeV and a dosage of 2E13 (cm$^{-2}$), to form the LDD region of the n-type TFT. The length of the LDD region is determined by the amount of side etching of the wet-etched Mo film. One example is about 0.8 $\mu$m. This length can be controlled by varying the overetching time of the Mo film.

Then, the implanted impurity is activated by a rapid thermal anneal (RAT) method of irradiating the TFT glass substrate GLS with light of an excimer lamp or a metal halide lamp. Since annealing is performed with light containing a large amount of ultraviolet light such as that of the excimer lamp or the metal halide lamp, only the polycrystalline silicon layer PSI can be selectively heated, whereby it is possible to avoid damage due to the heating of the TFT glass substrate GLS. The activation of the impurity can also be effected by a thermal treatment with a temperature of about 450° C. or more within the range in which substrate shrinkage, warpage deformation or the like does not become a problem.

Figure 8:
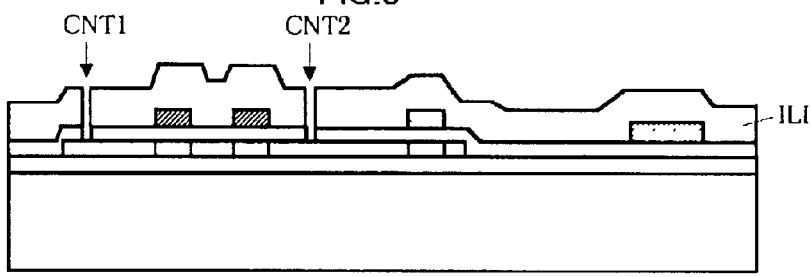
FIG. 8 is a diagrammatic cross-sectional view showing a third photo-process of the one embodiment of the invention.

A manufacturing method to be carried out until the completion of a third photo-process shown in FIG. 8 will be described.

A $SiO_2$ film of thickness 500 nm is formed by a plasma CVD method using a mixed gas of tetraethoxysilane and oxygen to obtain the interlayer insulating film ILI. At this time, the mixture ratio of tetraethoxysilane and oxgen is 1:5, and the forming temperature is 350° C.

After that, a predetermined resist pattern is formed and then, the first through-hole CNT1, the second through-hole CNT2 and the third through-hole CNT3 in the plan view of FIG. 1 are opened in the interlayer insulating film by a wet etching method using a mixed acid.

Figure 9:
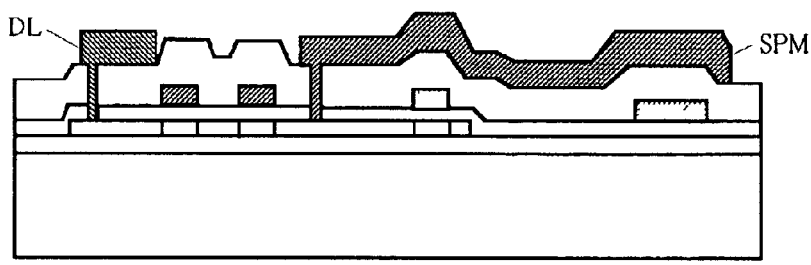
FIG. 9 is a diagrammatic cross-sectional view showing a fourth photo-process of the one embodiment of the invention.

A manufacturing method to be carried out until the completion of a fourth photo-process shown in FIG. 9 will be described below.

After a Ti film of thickness 50 nm, an Al—Si alloy of thickness 500 nm and a Ti film of thickness 50 nm have been stacked in that order by a sputtering method, a predetermined resist pattern is formed on the stacked films and is collectively etched by a reactive ion etching method using a mixed gas of $BCl_3$ and $Cl_2$, thereby forming the drain line DL, the metal pixel electrode SPM and the electrode pad PAD shown in the plan view of FIG. 1.

Figure 10:
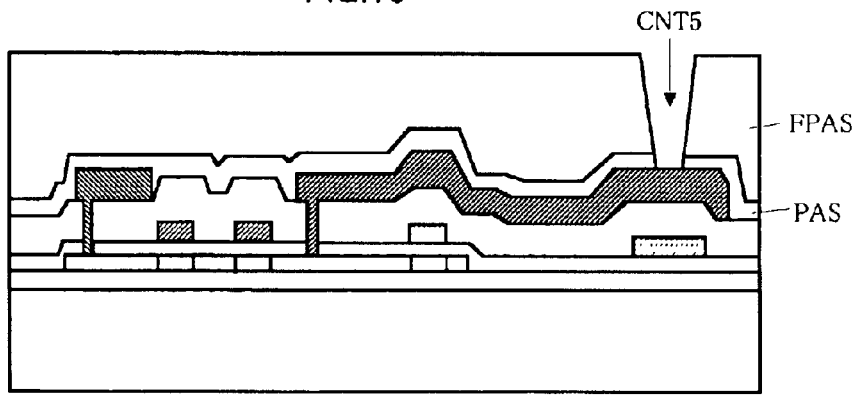
FIG. 10 is a diagrammatic cross-sectional view showing a fifth photo-process of the one embodiment of the invention.

A manufacturing method to be carried out until the completion of a fifth photo-process shown in FIG. 10 will be described below.

The protective film PAS which is a $Si_3N_4$ film of thickness 300 nm is formed by a plasma CVD method using a mixed gas of $SiH_4$, $NH_3$ and $N_2$, and the protective film PAS is coated with an acrylic photosensitive resin with a thickness of about 3.5 $\mu$m by spin coating. The acrylic photosensitive resin film is exposed and developed with a predetermined mask to form a through-hole in the acrylic photosensitive resin film. Then, the acrylic resin is calcinated by being baked at 230° C. for 20 minutes to form the leveling organic protective film FPAS of thickness 2.0 $\mu$m. Then, the through-hole pattern provided in the organic protective film FPAS is used as a mask to work the underlying $Si_3N_4$ film with a reactive ion etching method using $CF_4$, thereby forming the fourth contact hole CNT4 and the fifth contact hole CNT5 shown in FIG. 1 in the $Si_3N_4$ film. In Embodiment 1, two layers of films are patterned through one photo-process by working the underlying insulating film by using the organic protective film FPAS as a mask, whereby one exposure process is omitted and a simplification of the manufacturing process and a reduction in cost are realized.

Finally, a manufacturing method to be carried out until the completion of a sixth photo-process shown in FIG. 3 will be described below.

An ITO film of thickness 70 nm is formed by a sputtering method, and is worked into a predetermined shape by a wet-etching method using a mixed acid, to form the transparent common electrode CPT and the transparent pixel electrode SPT shown in the plan view of FIG. 1. Thus, the active matrix substrate is completed (FIG. 3).

Through the above-described six photo-processes, the working of the films on the TFT glass substrate GLS1 using the polycrystalline silicon TFT is completed.

Figure 11:
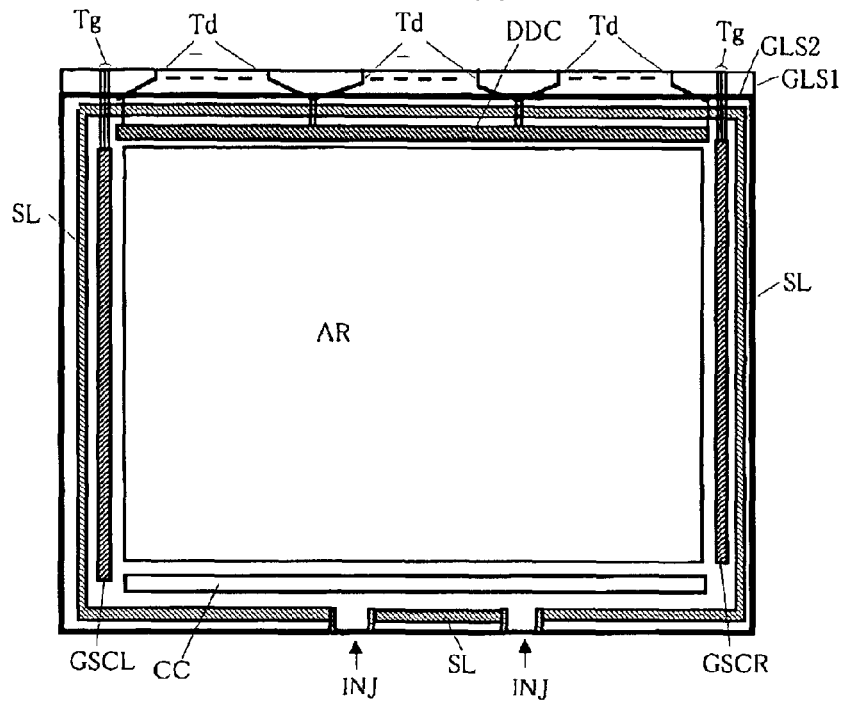
FIG. 11 is a general plan view of an LCD cell.

The plane structure of the external appearance of a liquid crystal display panel will be described below. FIG. 11 is a plan view showing the essential portion of the periphery of a matrix (AR) of a display panel which includes the lower and upper transparent glass substrates GLS1 and GLS2. In the manufacture of this type of panel, if small-sized panels are to be manufactured, a plurality of devices are worked on one glass substrate at the same time and the glass substrate is divided into the individual devices for the purpose of increasing throughput. If large-sized panels are to be manufactured, even in the case of any kind of article, a standard-sized glass substrate is worked and is then reduced to a size suited to the kind of article for the purpose of sharing manufacturing facilities among various kinds of articles. In either case, after a series of processes have been completed, the glass is cut.

FIG. 11 shows the lower and upper glass substrates GLS1 and GLS2 which are already cut. On the top side of the display panel shown in FIG. 11, external connecting terminal groups Tg and Td are present, and the size of the upper substrate GLS2 is made smaller than that of the substrate GLS1 so that the upper substrate GLS2 is set back from the substrate GLS1 to expose the terminal groups Tg and Td. Each of the terminal groups Tg includes connecting terminals which are associated with power source data and timing data to be supplied to the corresponding one of scanning circuits GSCL made of low-temperature polysilicon TFTs which are respectively disposed on the left and right sides of the display part AR on the TFT glass substrate GLS1 which will be described later. Each of the terminal groups Td includes terminals for supplying video data or power source data to a video signal circuit DDC made of low-temperature polysilicon TFTs on the TFT glass substrate GLS1 in the top portion of the display part AR. The lead line portion of each of the terminals Td includes a plurality of lead lines which are assembled for each individual tape carrier package TCP (which will be described later) on which an integrated circuit chip CHI is mounted.

The lead lines of each of the terminals Td extend from the matrix portion AR to an external connecting terminal portion through the video signal circuit DDC, and are arranged so that the inclinations of the lead lines gradually become larger toward each of the outermost lead lines. This arrangement is intended to adjust the video signal terminals Td of the display panel to the arrangement pitch of the tape carrier packages TCP and the connecting terminal pitch of each of the tape carrier packages TCP.

The sealing pattern SL is formed to seal the liquid crystal LC between the transparent glass substrates GLS1 and GLS2 along the edges thereof except a liquid crystal injecting port INJ. The sealing material is made of, for example, an epoxy resin.

The layers of the alignment films ORI shown in cross-sectional structure in FIG. 2 are formed on the inside of the sealing pattern SL. The liquid crystal LC is sealed in the area defined by the sealing pattern SL between the lower alignment film ORI and the upper alignment film ORI which serve to set the orientation of liquid crystal molecules.

This liquid crystal display device is assembled by stacking various layers on each of the lower transparent TFT glass substrate GLS1 and the upper transparent CF glass substrate GLS2, forming the sealing pattern SL on the substrate GLS2, superposing the lower transparent TFT glass substrate GLS1 and the upper transparent CF glass substrate GLS2 on each other, injecting the liquid crystal LC through the opening INJ of the sealing material SL, sealing the injecting port INJ with an epoxy resin or the like, and cutting the upper and lower glass substrates SUB1 and SUB2.

Figure 12:
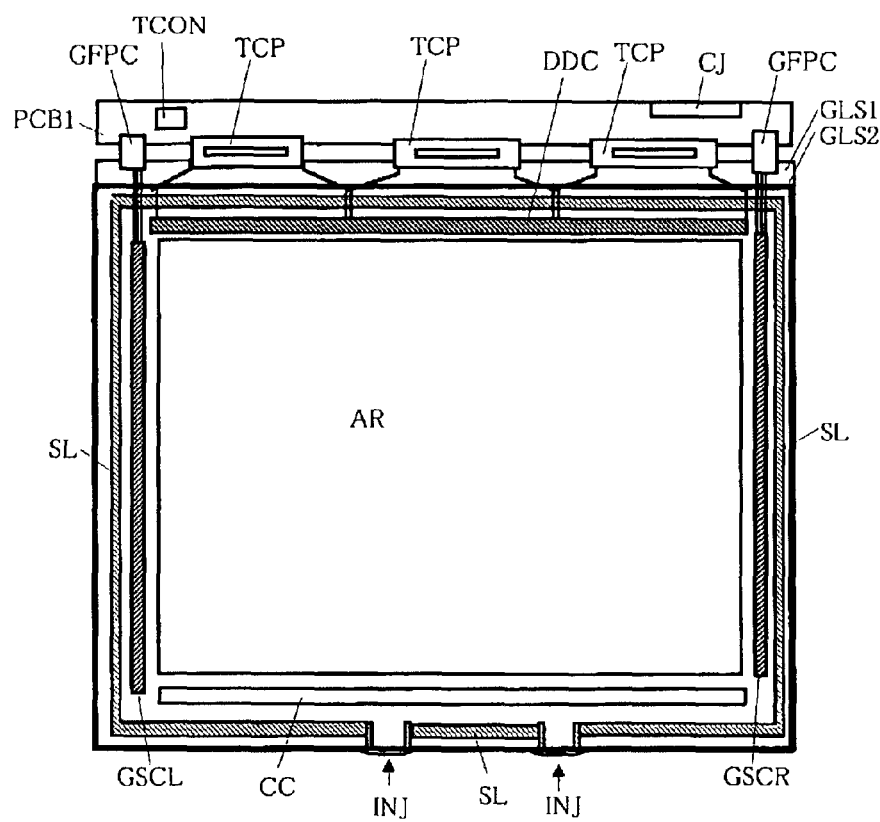
FIG. 12 is a general plan view of the LCD cell to which a printed circuit board and tape carrier packages are connected.

FIG. 12 is a top plan view showing the state of connection between the tape carrier packages TCP which are disposed on the display panel shown in FIG. 11 and on which video signal driver ICs are respectively mounted and the video signal circuit DDC formed of low-temperature polysilicon TFTs on the TFT glass substrate GLS1 and the state of connection between the scanning circuits GSCL formed of low-temperature polysilicon TFTs on the TFT glass substrate GLS1 and an external circuit.

Symbol TCP denotes tape carrier packages on which the respective driver IC chips are mounted by tape automated bonding (TAB), and Symbol PCB1 denotes a driver circuit board on which are mounted the TCPs, a control IC TCON, a power source amplifier, resistors, capacitors and the like. Symbol CJ denotes a connector connecting part through which to introduce signals from a personal computer or electric power.

Figure 13:
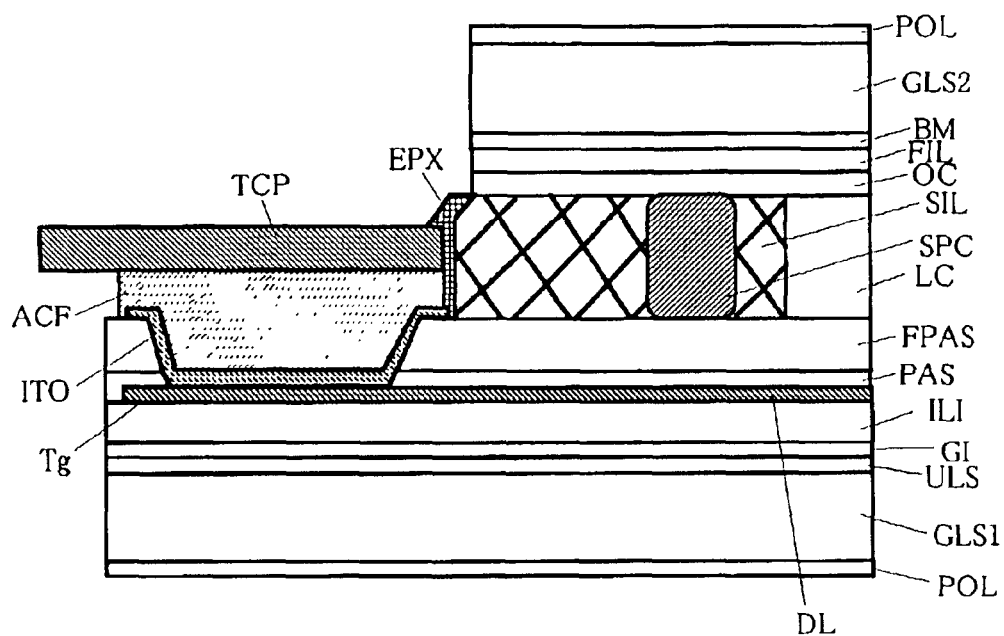
FIG. 13 is a cross-sectional view of a tape carrier package and a portion near a drain-side lead terminal portion of the LCD cell.

FIG. 13 is a diagrammatic cross-sectional view showing the state in which one of the tape carrier packages TCP is connected to the corresponding one of the terminals Td for signal circuits, of the liquid crystal display panel. The tape carrier package TCP is connected to the liquid crystal display panel by an anisotropic conductive film ACF. It is preferable that an end portion of the tape carrier package TCP be electrically connected to the connecting terminal Td on the liquid crystal display panel. However, the end portion of the tape carrier package TCP is actually connected to the transparent electrode ITO which is formed to cover the opening formed in the protective film PAS and the organic protective film FPAS of the TFT, and which is formed in the same process as the transparent common electrode CPT. The gap between the lower and upper transparent glass substrates GLS1 and GLS2 on the outside of the sealing material SL is protected by an epoxy resin EPX or the like after having been cleaned, and the portion between the package TCP and the upper CF substrate GLS2 is charged with a silicone resin to realize multiple protection. The height of the gap between the liquid crystal LC and each of the upper and lower glass substrates GLS2 and GLS1 is determined by a spacer SPC formed of an organic film.

Figure 14:
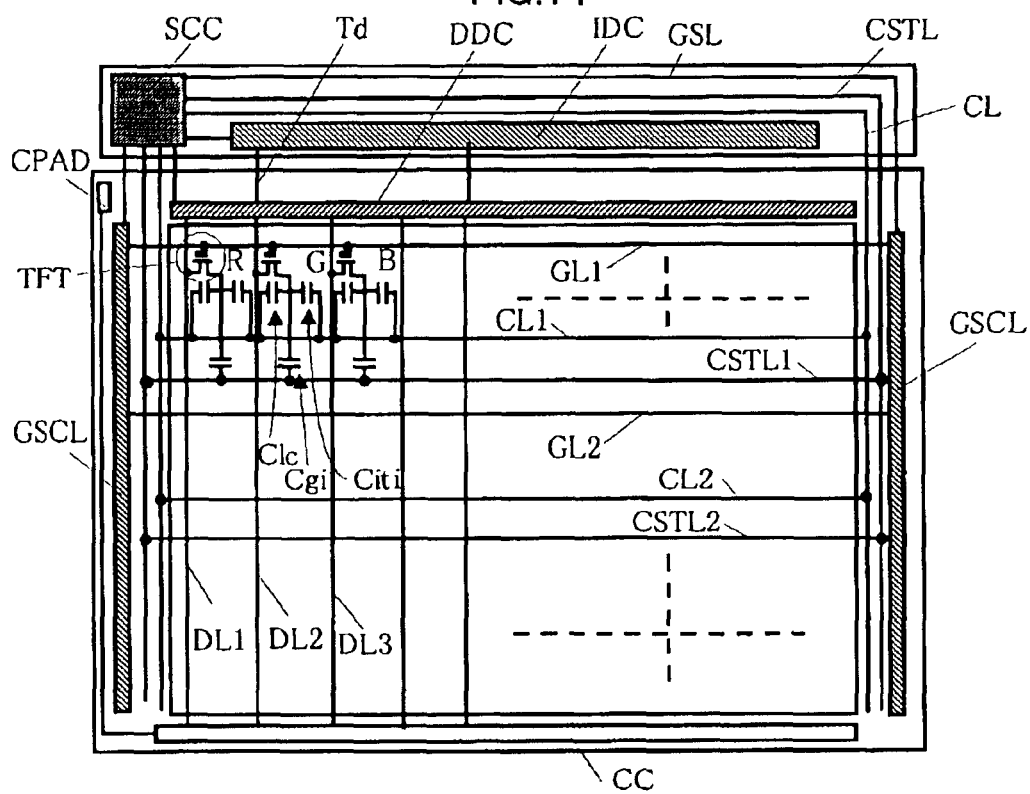
FIG. 14 is a diagrammatic plan view showing the equivalent circuit of the TFT liquid crystal display device.

FIG. 14 is a connection diagram showing the equivalent circuit and its peripheral circuit of the display matrix part. FIG. 14 is a circuit diagram which is drawn to correspond to an actual geometric arrangement.

In FIG. 14, symbol DL generally denotes drain lines, and the drain lines DL are respectively numbered in ascending order like DL1, DL2 and DL3 from the left of the screen. Affixes R, G and B are added to red, green and blue pixels, respectively. Symbol GL generally denotes gate lines, and the gate lines GL are respectively numbered in ascending order like GL1 and GL2 from the top of the screen. Affixes 1 and 2 are added in accordance with the order of scanning timing. Symbol CL generally denotes common electrode lines, and the common electrode lines CL are respectively numbered in ascending order like CL1 and CL2 from the top of the screen.

Symbol CSTL generally denotes storage capacitance lines, and storage capacitance lines are respectively numbered in ascending order like CSTL1 and CSTL2 from the top of the screen.

The gate lines GL (whose affixes are omitted) are connected to the scanning circuits GSCL on the glass substrate GLS1, and electric power or timing signals are supplied to the scanning circuits GSCL from a power source and timing circuit SCC which are formed on a printed circuit board outside the glass substrate GLS1. The scanning circuits GSCL formed of the low-temperature polysilicon TFTs on the glass substrate GLS1 are arranged to supply electric power to each of the gate lines (scanning lines) GL from both right and left sides thereof in order to increase redundancy. However, according to screen size or the like, electric power may also be supplied from one side.

The drain signal lines DL are supplied with electric power from the signal circuit DDC formed of low-temperature polysilicon TFTs on the glass substrate GLS1. The signal circuit DDC has the function of distributing video data supplied from a circuit made of video signal circuit ICs on the glass substrate GLS1, according to RGB color data. Accordingly, the number of the connecting terminals of the signal circuit DDC that receive video data from the circuit on the glass substrate GLS1 is one third of the number of the drain lines DL in the screen.

The common electrode lines CL give common potentials to the pixels in the screen, and since the common electrode lines CL give an approximately constant potential in the driving method for each kind of voltage in Embodiment 1, the common electrode lines CL are led to the right and left and collectively connected together, and are connected to the power source and timing circuit IC SCC.

Each low-temperature polysilicon TFT in the screen is an n-type TFT, and when a gate voltage is applied to the corresponding one of the gate lines GL, a drain voltage (data) supplied to the corresponding one of the drain signal lines DL at this timing is supplied to a liquid crystal capacitance Clc between the common electrode line CL and the drain line DL, thereby providing display. In order to improve the ability to maintain the potential of the liquid crystal capacitance Clc during display periods, the electrode storage capacitance Cstg is formed by combining the storage capacitance value Cgi with the storage capacitance Cili which uses the interlayer insulating film between the common electrode line CL and the pixel electrode as a dielectric layer. The storage capacitance value Cgi uses as its electrodes the storage capacitance line CSTL and the polysilicon layer which constitutes a pixel electrode, and uses the gate insulating film GI as its dielectric. The storage capacitance Cili uses as its dielectric the interlayer insulating film ILI between the common electrode line CL and the pixel electrode. Symbol CC denotes an inspection circuit which is formed of low-temperature polysilicon TFTs and serves to inspect disconnection of each of the drain signal lines DL. Symbol CPAD denotes an inspection terminal.

Figure 15:
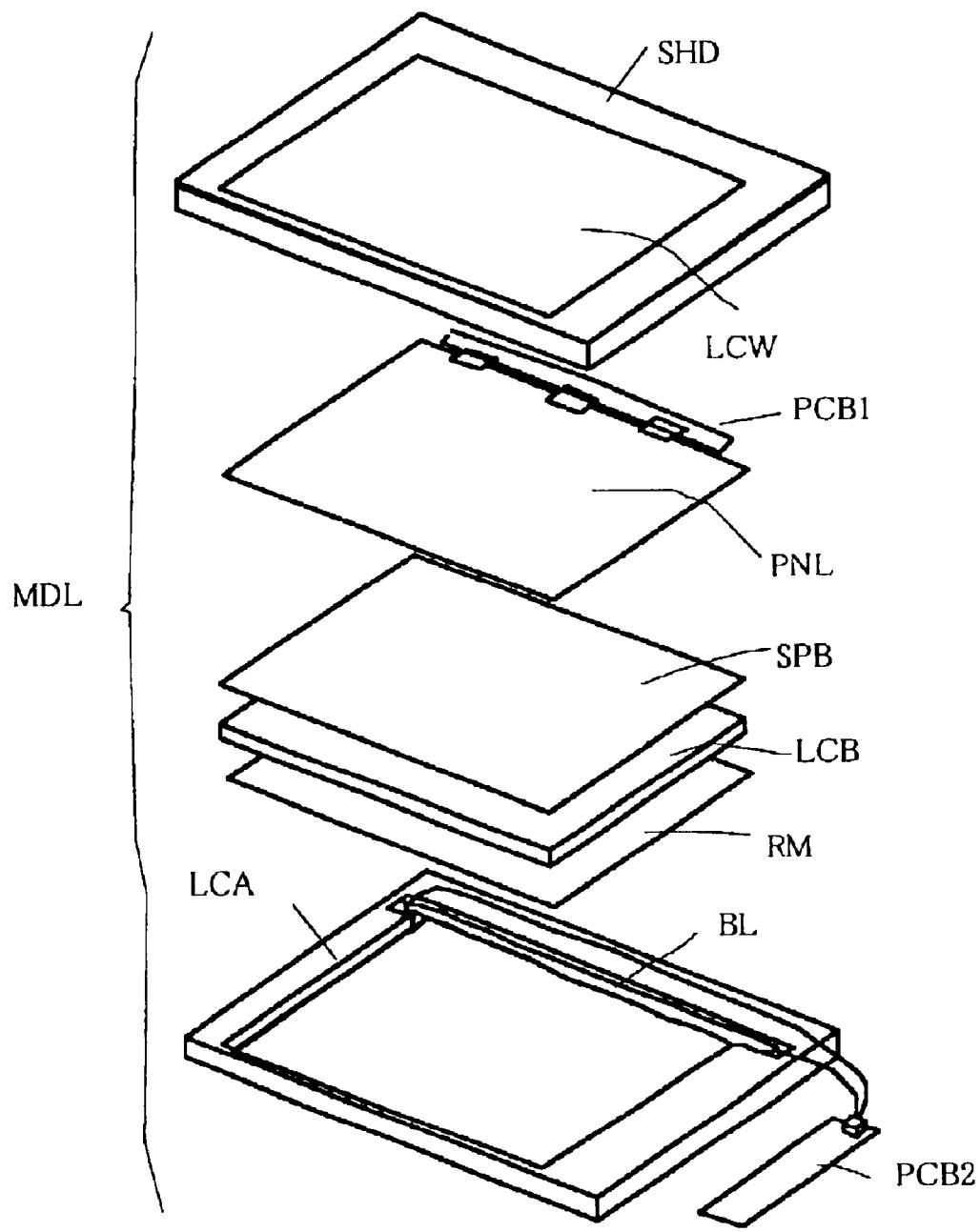
FIG. 15 is an exploded perspective view of a module of the TFT liquid crystal display device.

FIG. 15 is an exploded perspective view of constituent components of a liquid crystal display module MDL. In FIG. 15, symbol SHD denotes a frame-shaped shield case (metal frame) made of a metal plate; LCW a display window of the shield case SHD; PNL a liquid crystal display panel; SPB an optical diffusion sheet; LCB a light guide plate; RM a reflecting sheet; BL a backlight fluorescent tube; and LCA a backlight case. These members are stacked in the shown arrangement to assemble the liquid crystal display module MDL.

The liquid crystal display module MDL is constructed so that all the members are fixed by claws and hooks disposed on the shield case SHD. The backlight case LCA has a shape which accommodates the backlight fluorescent tube BL, the optical diffusion sheet SPB, the light guide plate LCB and the reflecting sheet RM. Light of the backlight fluorescent tube BL which is disposed on one side of the light guide plate LCB is formed into backlight which becomes uniform on the display screen, by the light guide plate LCB, the reflecting sheet RM and the optical diffusion sheet SPB, and the backlight is made to exit toward the liquid crystal display panel PNL. An inverter circuit board PCB2 is connected to the backlight fluorescent tube BL, and serves as the power source of the backlight fluorescent tube BL.

As described above in detail, the largest feature of the structure of Embodiment 1 resides in the construction of the special storage capacitance, and even if a TN type, a VA type, an MVA type, a PVA type, an OCB type or an FFS type of liquid crystal display device is constructed by using the concept disclosed in Embodiment 1, it is possible to achieve the advantage of capacitance increase.

(Embodiment 2)

Figure 16:
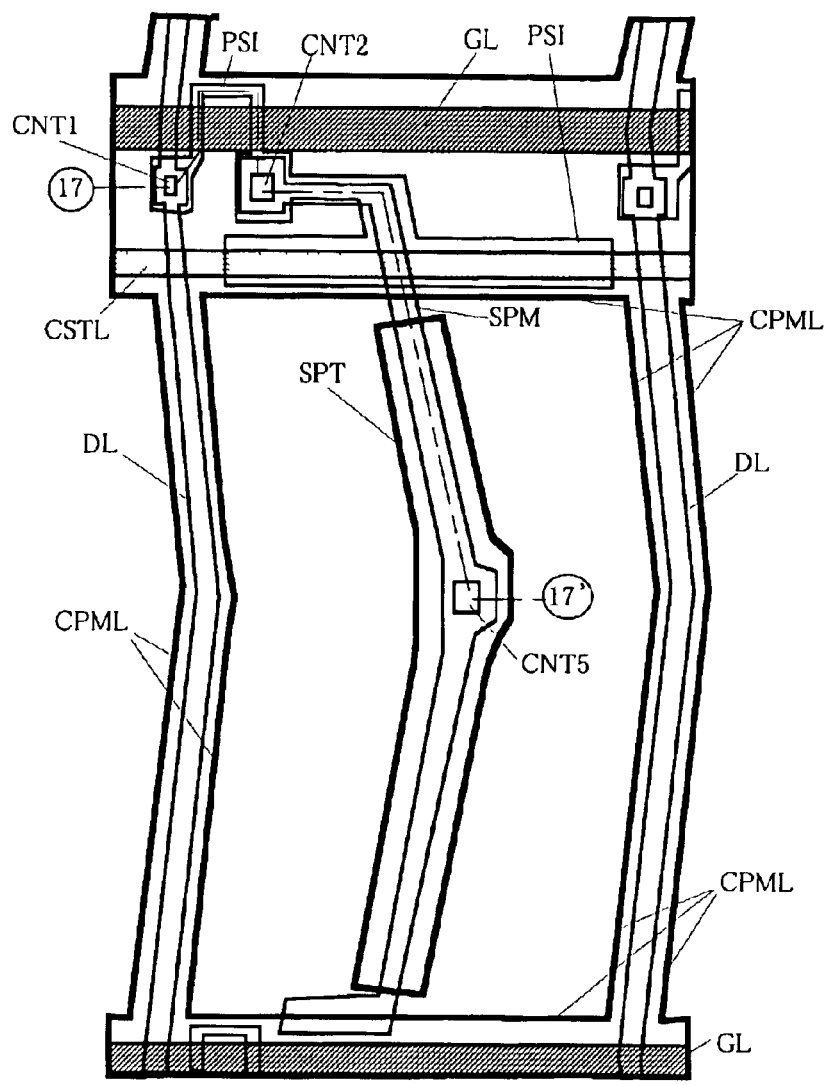
FIG. 16 is a diagrammatic plan view of a unit pixel of a TFT liquid crystal display device according to another embodiment of the invention.
Figure 17:
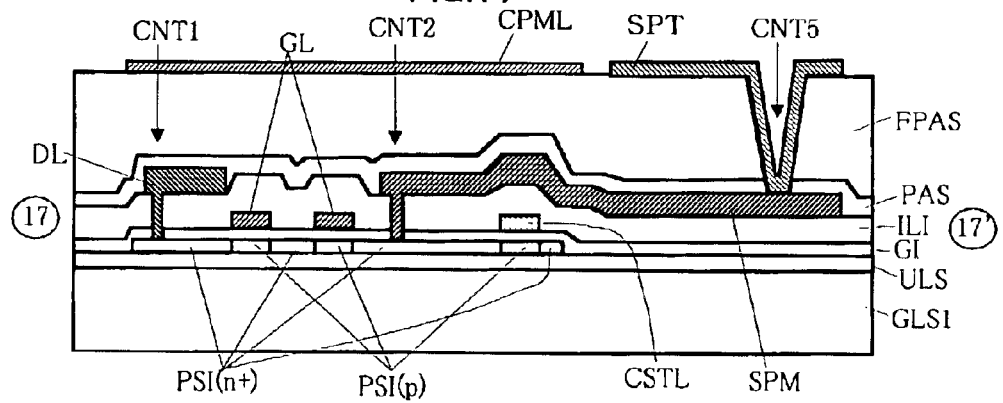
FIG. 17 is a diagrammatic cross-sectional view taken along cutting line 18–18' of FIG. 16.

FIG. 16 is a diagrammatic plan view of a unit pixel of Embodiment 2, and FIG. 17 shows a cross-sectional structure taken along cutting line 17–17' of FIG. 16.

The structure of Embodiment 2 differs from that of Embodiment 1 in that the common electrode line CL shown in FIG. 1 is eliminated which traverses the middle portion of the pixel approximately in parallel with the gate lines GL. Furthermore, in Embodiment 1, the contact holes formed in the insulating film are provided at five locations per pixel, but in Embodiment 2, the number of contact holes per pixel is reduced to three. Accordingly, the number of lines to be formed in the same layer as the gate lines GL is reduced, and therefore, a short-circuit fraction defective is reduced, whereby it is possible to achieve the advantage of an improvement in yield. Furthermore, Embodiment 2 has the advantage that since the number of contact holes is reduced, an open failure (a failure which disables electrical conduction in a contact hole) due to a defective formation of a contact hole is suppressed. Furthermore, since the common electrode line CL disposed in parallel with the gate lines GL is eliminated, the aperture ratio is improved, whereby a further improvement in luminance can be realized.

In Embodiment 2, it is desirable that a common electrode CPML be formed of a metal material such as Mo, Al or Ti or an alloy of these metals. This is because variations in common signals can be restrained even if the common electrode line CL using a low-resistance metal material of Embodiment 1 is eliminated.

Furthermore, the common electrode CPML may also have a stacked structure made of a metal material such as Mo, Al, Cr or Ti and a high-resistance transparent material such as ITO. In this construction, in the case where the contour of the low-resistance material is disposed at least 1.5 $\mu$m (for a positive type of liquid crystal material) or at least 3 $\mu$m (for a negative type of liquid crystal material) inward from the contour of the common electrode CPML toward the inside of the common electrode CPML in plan view, the ends of the transparent common electrode CPML become transparent areas, whereby a far brighter IPS type of liquid crystal display device can be obtained. In this case, the transparent pixel electrode SPT may also be a single-layer transparent electrode.

FIG. 17 is a cross-sectional view taken along line 17–17' of FIG. 16. The charging passage of pixel potential starts at the drain line DL to which to apply a video voltage, and passes through the high-concentration n+type polysilicon layer PSI(n$^+$), the p-type polysilicon layer PSI(p) which, when an ON voltage is applied to the gate line GL, is inverted to conduct electricity, and the second contact hole CNT2, and further passes through the metal pixel electrode SPM and the fifth contact hole CNT5 and leads to the transparent pixel electrode SPT. In addition, the voltage Vst which sets the TFT to the ON state is applied to the storage capacitance line CSTL, whereby the storage capacitance line CSTL has a structure which can obtain a large storage capacitance value per unit area by using the gate insulating film GI as the dielectric.

As described above, the common electrode CPML is formed of the low-resistance metal material or the stacked structure made of the low-resistance metal material and the high-resistance transparent electrode material such as ITO. In this case, the transparent pixel electrode SPT may also be made of the low-resistance metal material formed in the same process and of the same material as the common electrode CPML.

(Embodiment 3)

Figure 18:
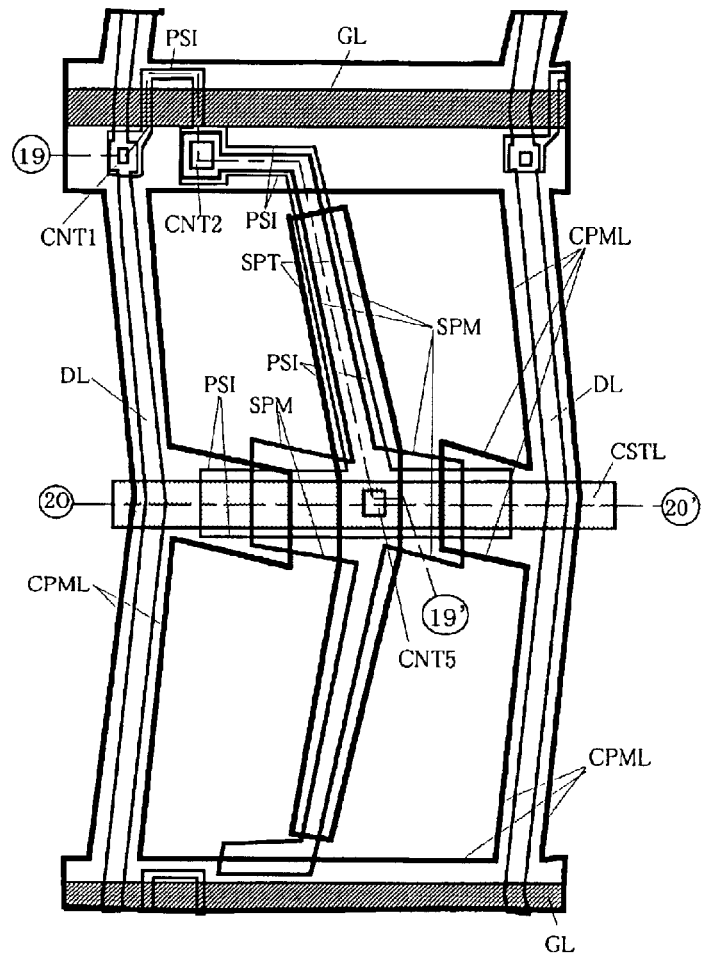
FIG. 18 is a plan view of a unit pixel of a TFT liquid crystal display device according to another embodiment of the invention.
Figure 19:
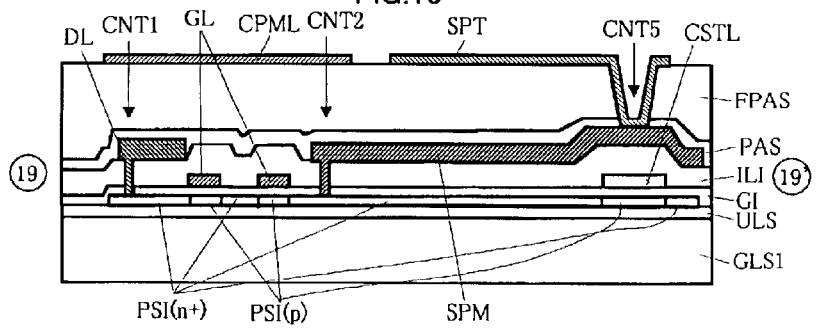
FIG. 19 is a diagrammatic cross-sectional view taken along cutting line 19–19' of FIG. 18.
Figure 20:
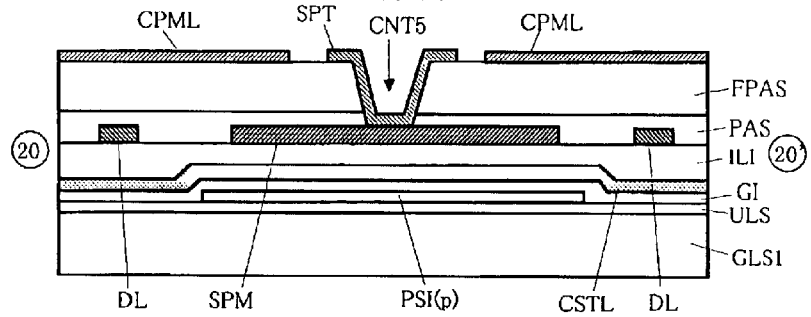
FIG. 20 is a diagrammatic cross-sectional view taken along cutting line 20–20' of FIG. 18.

FIG. 18 is a plan view of a unit pixel of Embodiment 3, FIG. 19 shows a cross-sectional structure taken along cutting line 19–19' of FIG. 18, and FIG. 20 shows a cross-sectional structure taken along cutting line 20–20' of FIG. 18.

Although in Embodiments 1 and 2 the storage capacitance line CSTL is disposed adjacent to the gate line GL, in Embodiment 3, the storage capacitance line CSTL is disposed in the middle between the adjacent drain lines DL, i.e., in the position where the common electrode line CL is disposed in Embodiment 1 shown in FIG. 1. Furthermore, this storage capacitance line CSTL is covered with the common electrode CPML and the metal pixel electrode SPM in such a manner that the common electrode CPML and the metal pixel electrode SPM overlap one on top of the other in plan view. Accordingly, it is possible to realize a shield which blocks leak electric fields from the storage capacitance line CSTL while preventing short-circuiting.

In this structure, as compared with Embodiment 1, the aperture ratio of the area occupied by the storage capacitance line CSTL is improved, whereby it is possible to realize a far brighter liquid crystal display device.

FIG. 19 is a cross-sectional view taken along cutting line 19–19' of FIG. 18, and shows cross-sectional structures of a TFT and a storage capacitance portion which drive the liquid crystal capacitance of the pixel. The operation of the TFT is similar to that in each of Embodiments 1 and 2. When an ON voltage is applied to the gate line GL of the TFT, a current from the drain line DL flows in the TFT. At this time, since an ON voltage is being applied to the storage capacitance line CSTL, a storage capacitance operates which uses the storage capacitance line CSTL as one electrode, the p-type polysilicon layer PSI(p) as another electrode, and the gate insulating film GI as a dielectric. Liquid crystal molecules are driven by lateral electric fields, i.e., electric fields which have components formed in parallel with the glass substrate GLS1 between the common electrode CPML and the transparent pixel electrode SPT. The common electrode CPML is made of a low-resistance metal or a stacked layer of a low-resistance metal and a transparent electrode material such as ITO, and the transparent pixel electrode SPT is supplied with a current from the TFT and is connected to the metal pixel electrode SPM.

The storage capacitance line CSTL is electrically shielded by the metal pixel electrode SPM and the common electrode CPML, as shown in FIG. 19.

FIG. 20 is a cross-sectional view taken along cutting line 20–20' of FIG. 18, and also is a cross-sectional view of the storage capacitance line CSTL which traverses a portion intermediate between the adjacent drain lines DL.

The storage capacitance line CSTL traverses the portion which underlies the adjacent drain lines DL and is intermediate therebetween, and the storage capacitance line CSTL is insulated from the adjacent drain lines DL by the interlayer insulating film ILI. A voltage not lower than the ON voltage applied to the gate of the TFT is applied to the storage capacitance during operation including storage periods. Accordingly, electrons are induced on the interfacial surface of the p-type polysilicon layer PSI(p) which is in contact with the gate insulating film GI, and the p-type polysilicon layer PSI(p) operates as a conductive electrode. Accordingly, the storage capacitance using the gate insulating film GI as its dielectric functions.

On the other hand, since the voltage of the storage capacitance line CSTL differs from a driving voltage applied to the liquid crystal LC, the voltage of the storage capacitance line CSTL needs to be electrically shielded. In Embodiments 1 and 2, this shielding is effected by means of the common potential of the transparent common electrode CPT or the common electrode CPML.

In Embodiment 3, as is apparent from the cross-sectional structure, the common electrode CPML on the organic protective film FPAS and the transparent pixel electrode SPT are basically formed in the same process, so that a shield using, for example, coating with only the common electrode CPML cannot be adopted, because such a shield electrically causes a short-circuit failure. For this reason, in Embodiment 3, since the disturbance of electric fields applied to the liquid crystal LC does not occur at the potential of the common electrode CPML and the potential of the pixel electrode SPM, the common electrode CPML and the metal pixel electrode SPM as well as the transparent pixel electrode SPT are isolated by a stacked layer made of the interlayer insulating film ILI which is an insulating film, the protective film PAS and the organic protective film FPAS. In addition, the common electrode CPML and the metal pixel electrode SPM are disposed to overlap one above the other so as not to short-circuit to each other, thereby electrically shielding the voltage of the storage capacitance line CSTL.

Each of Embodiments 1 to 3 has been described with reference to an IPS type of TFT liquid crystal display device using TFTs having a so-called n-type MOS structure, but it goes without saying that Each of Embodiments 1 to 3 can be applied to a liquid crystal display device using TFTs having a p-type MOS structure.

(Embodiment 4)

Figure 21:
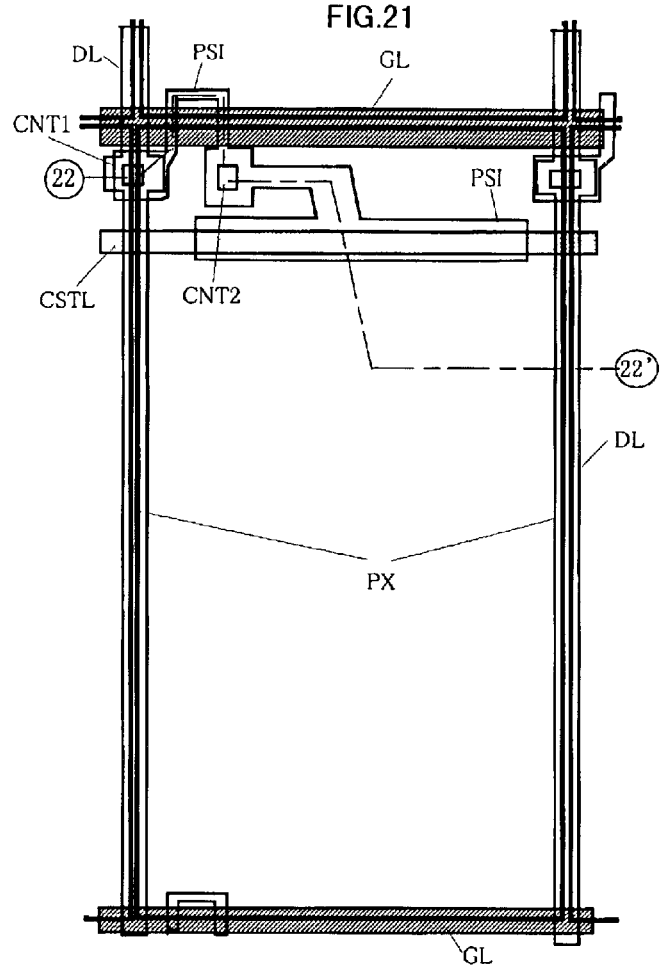
FIG. 21 is a plan view of a unit pixel of a TFT liquid crystal display device according to another embodiment of the invention.
Figure 22:
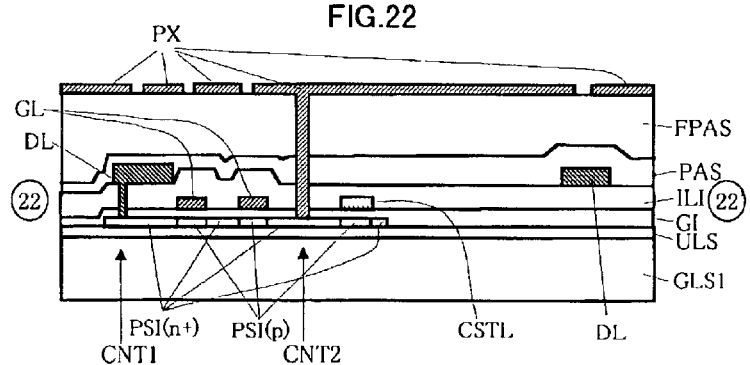
FIG. 22 is a diagrammatic cross-sectional view taken along cutting line 22–22' of FIG. 21.
Figure 23:
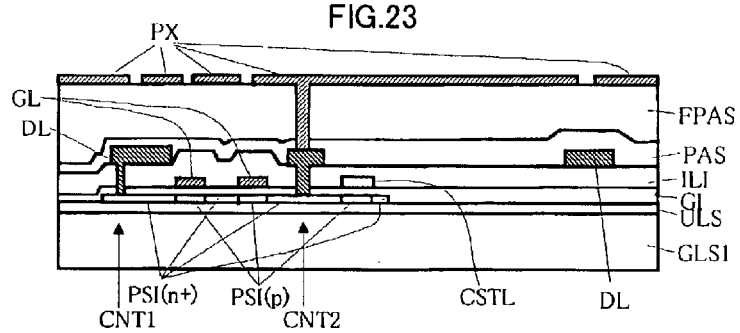
FIG. 23 is a diagrammatic cross-sectional view of a modification of the embodiment shown in FIG. 21.

FIG. 21 is a plan view of a unit pixel of Embodiment 4, FIG. 22 shows a cross-sectional structure taken along cutting line 22–22' of FIG. 21, and FIG. 23 shows a modification of the cross-sectional structure shown in FIG. 22.

Embodiment 4 is an example in which the concept of the formation of the storage capacitance by the polycrystalline silicon film PSI and the storage capacitance line CSTL is applied to a TN type of liquid crystal display device. The pixel electrode PX is connected to the polycrystalline silicon film PSI via the second contact hole CNT2, and is supplied with a pixel potential. The pixel electrode PX is formed of a transparent electrode material such as ITO, and the boundary portion of the pixel electrode PX is formed above the gate lines GL and the drain lines DL in terms of an improvement in aperture ratio. A counter substrate (not shown) has a common electrode made of a transparent electrode material such as ITO, and the potential difference between the common electrode and the pixel electrode is formed in a direction perpendicular to the substrate GLS1, whereby liquid crystal molecules are driven by a so-called longitudinal electric field.

In Embodiment 4, an increase in the storage capacitance is realized by a liquid crystal display device of a type other than the IPS type.

FIG. 22 is a cross-sectional view taken along cutting line 22–22' of FIG. 21, and shows a cross-sectional structure of a TFT and a storage capacitance portion which drive the liquid crystal capacitance of the pixel. The operation of the TFT is similar to that in Embodiment 1. When an ON voltage is applied to the gate line GL of the TFT, a current from the drain line DL flows in the TFT. At this time, since an ON voltage is being applied to the storage capacitance line CSTL, the storage capacitance operates which uses the storage capacitance line CSTL as one electrode, the p-type polysilicon layer PSI(p) as another electrode, and the gate insulating film GI as a dielectric.

FIG. 23 shows a modification of the cross-sectional structure shown in FIG. 22. Instead of the contact between the pixel electrode PX and the polycrystalline silicon film PSI at the second contact hole CNT2, the polycrystalline silicon film PSI is in contact with an electrode pad PAD formed of the layer of the drain line DL, and this electrode pad PAD is in contact with the pixel electrode PX. Symbol PST denotes a semiconductor layer, and there is a case where the semiconductor layer PST is oxidized owing to the presence of oxygen and an oxidized layer is formed on the surface of the semiconductor layer PST to increase the connection resistance of the semiconductor layer PST. The pixel electrode PX is a transparent electrode, but is typically made of an conductive oxide such as ITO. Accordingly, an improvement in reliability and an improvement in characteristic can be realized by taking countermeasures against such phenomenon.

For this reason, the electrode pad PAD is formed as a metal layer so that the polycrystalline silicon film PSI is brought into contact with the metal layer, and the electrode pad PAD which is the metal layer is brought into contact with the pixel electrode PX to form electrical connection therebetween.

According to Embodiment 4, it is possible to achieve the advantage of capacitance increase even in the construction of a vertical electric field type of liquid crystal display device or a TN type, a VA type, an MVA type, a PVA type, an OCB type or an FFS type of liquid crystal display device.

In the present specification, the term "polysilicon" is used as a term opposite to "amorphous", which means a semiconductor imparted crystallinity, and encompasses all kinds of polysilicon or p-Si, whether of a high- or low-temperature type. The term "polysilicon" also encompasses macrocrystalline silicon and continuous grain silicon (CGS) as well as single-crystal silicon. The semiconductor is not limited to silicon, and may be any other type of semiconductor imparted crystallinity.

(Embodiment 5)

Figure 24:
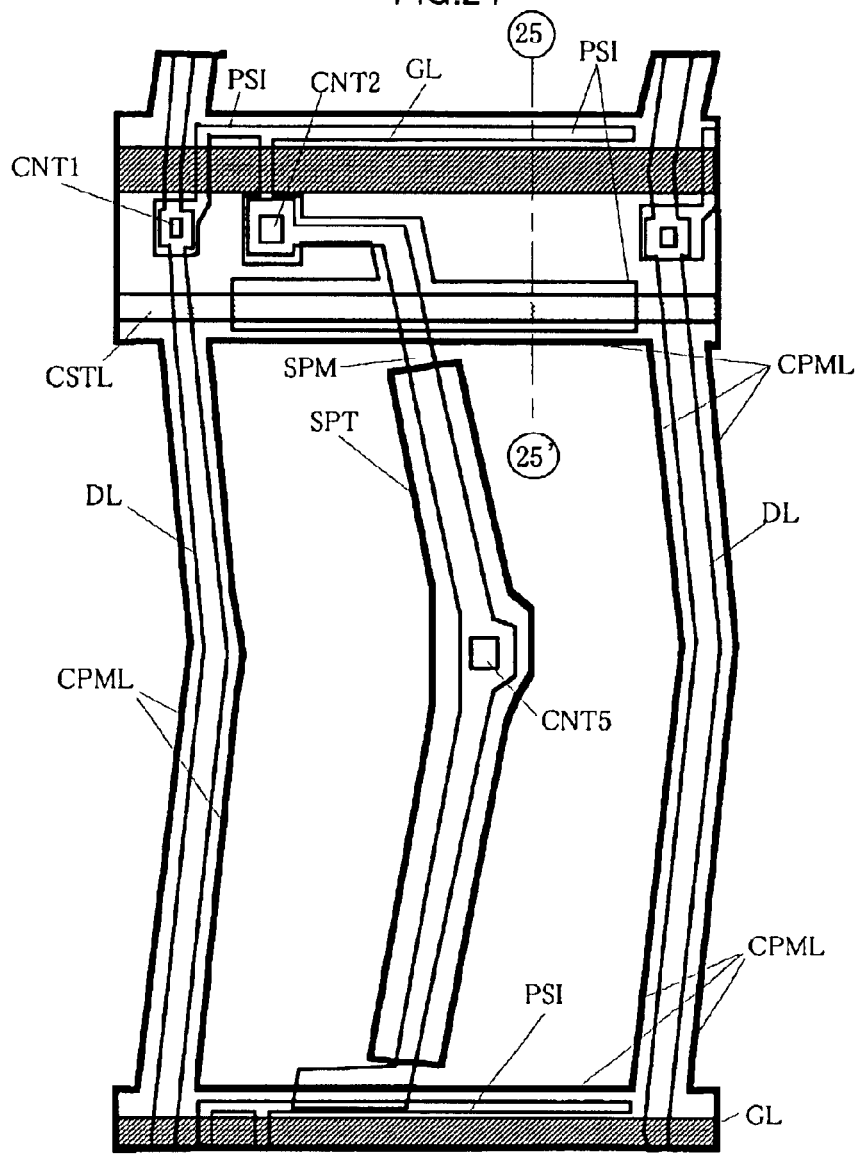
FIG. 24 is a plan view of a unit pixel of a TFT liquid crystal display device according to another embodiment of the invention.
Figure 25:
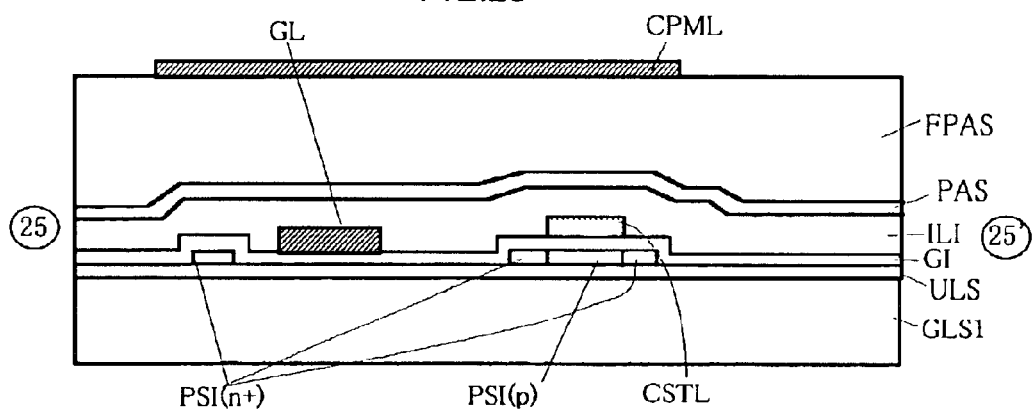
FIG. 25 is a diagrammatic cross-sectional view taken along cutting line 25–25' of FIG. 24.

FIG. 24 is a plan view of a unit pixel of Embodiment 5, and FIG. 25 shows across-sectional structure taken along cutting line 25–25' of FIG. 24. The structure and the operation of Embodiment 5 are described on the basis of the contents of Embodiment 2.

The structure of Embodiment 5 differs from that of Embodiment 1 in that the n+type polysilicon layer PSI is disposed to extend approximately in parallel with the gate line GL shown in FIG. 16. This structure further enhances an effect for reducing the malfunction of IPS display devices, i.e., the effect of forming a shield to block as completely as possible the potential of the gate line GL or the storage capacitance line CSTL as well as the potential of the drain line DL, which potentials are those other than pixel electrode potential and common electrode potential. Accordingly, it is possible to provide an IPS liquid crystal display device of superior image quality.

The polycrystalline silicon films PSI which provide pixel electrode potential are disposed in parallel with each other near the bottoms of ends of the common electrode line CPML which covers the gate line GL and the storage capacitance line CSTL disposed approximately in parallel with each other, with the overlying organic protective film FPAS interposed between the common electrode CPM and the gate line GL as well as the storage capacitance line CSTL, whereby the leak of electric fields from the gate line GL is reduced. The bottom portion of the end of the common electrode line CPML nearest the storage capacitance line CSTL is shielded by the portion of the polycrystalline silicon film PSI that projects from the bottom portion of the storage capacitance line CSTL.

FIG. 25 is a cross-sectional view taken along line 25–25' of FIG. 24. As shown in the left-hand side of FIG. 25, the top side of the gate line GL is shielded by the common electrode line CPML made of ITO, with the organic protective film FPAS interposed therebetween, while the bottom side of the gate line GL is shielded by the n+type polysilicon layer PSI below the gate insulating film GI. On the right-hand side of FIG. 25, the top side of the storage capacitance line CSTL is shielded by the portion of the n+type polysilicon layer PSI that projects from the bottom portion of the common electrode CPML. In this manner, the gate line GL or the storage capacitance line CSTL which causes the malfunction of the IPS liquid crystal display device is shielded by being covered from above with the common electrode line CPML made of ITO or the like with interposing the insulating film, and from below with the pixel electrode PX made of polysilicon or the like, whereby the effect of shielding is enhanced.

In Embodiment 5, the potential of the pixel electrode is used as the potential of the polysilicon layer which is disposed under the gate line GL and the storage capacitance line which cause the malfunction of the liquid crystal display device below the end of the common electrode line via the insulating film. Although the potential is the same as the potential of the common electrode line, an equivalent or greater level of shielding effect can be obtained.

Although the idea of the invention has been described above in detail with reference to the individual embodiments, it goes without saying that the ideas of the respective embodiments can be combined in various applications.

As is apparent from the above detailed description, according to the invention, it is possible to stably realize a large storage capacitance, whereby it is possible to realize a liquid crystal display device of high image quality, high yield and high performance. In particular in an IPS display type of liquid crystal display device made of low-temperature polysilicon TFTs, it is possible to realize a structure and driving which enable a large storage capacitance to operate stably, whereby it is possible to provide a bright TFT liquid crystal display device of high reliability.

What is claimed is:

1. A liquid crystal display device comprising:
   a liquid crystal layer clamped between a first transparent substrate and a second transparent substrate;
   a plurality of gate lines provided on the first transparent substrate;
   a plurality of drain lines disposed to intersect the plurality of gate lines in matrix form on the first transparent substrate;

pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected in accordance with a signal from one of the gate lines by the TFT element and is electrically supplied;

a semiconductor layer forming the TFT element; and a capacitance line forming a capacitance element with an insulating layer interposed between the semiconductor layer and the capacitance line, a potential difference of polarity capable of bringing the semiconductor layer into a conductive state being approximately constantly applied between the semiconductor layer and the capacitance line.

2. A liquid crystal display device comprising:

a liquid crystal layer clamped between a first transparent substrate and a second transparent substrate;

a plurality of gate lines provided on the first transparent substrate;

a plurality of drain lines disposed to intersect the plurality of gate lines in matrix form on the first transparent substrate; pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected in accordance with a signal from one of the gate lines by the TFT element and is electrically supplied;

a semiconductor layer formed integrally with the TFT element; and a capacitance line forming a capacitance element with an insulating layer interposed between the semiconductor layer and the capacitance line, the semiconductor layer formed integrally with the TFT element being electrically connected to the pixel electrode on a side of a gate electrode of the TFT element which side is opposite to a side where the drain line is formed, a potential difference to bring the semiconductor layer into a conductive state being approximately constantly applied to the capacitance line.

3. A liquid crystal display device comprising:

a liquid crystal layer clamped between a first transparent substrate and a second transparent substrate; a plurality of gate lines provided on the first transparent substrate;

a plurality of drain lines disposed to intersect the plurality of gate lines in matrix form on the first transparent substrate; pixels respectively formed by areas each surrounded by adjacent ones of the plurality of gate lines and adjacent ones of the plurality of drain lines, each of the pixels having at least one TFT element and a pixel electrode to which a signal from one of the adjacent drain lines is selected in accordance with a signal from one of the gate lines by the TFT element and is electrically supplied; the pixel electrode being formed of two layers which are a metal material layer and a transparent conductive layer;

a semiconductor layer formed integrally with the TFT element; and a capacitance line forming a capacitance element with an insulating layer interposed between the semiconductor layer and the capacitance line, the semiconductor layer being connected to the metal layer of the pixel electrode via a through-hole provided in the insulating layer, the metal layer of the pixel electrode being connected to the transparent conductive layer of the pixel electrode via a through hole provided in another insulating layer, a potential difference to being the semiconductor layer into a conductive state being approximately constantly applied to the capacitance line.

4. A liquid crystal display device according to claim 1, further comprising a common signal line on the first transparent substrate, the common signal line and the pixel electrode having portions superposed in plan view, the common signal line and the capacitance line differing in potential from each other.

5. A liquid crystal display device according to claim 1, further comprising a common electrode on the first transparent substrate, the common electrode being spaced apart from the pixel electrode, the liquid crystal layer being driven by electric fields having components formed in a direction parallel to the first transparent substrate between the common electrode and the pixel electrode.

6. A liquid crystal display device according to claim 1, wherein the insulating film between the semiconductor layer and the capacitance line is thinner in film thickness than any insulating film in contact with the pixel electrode.

7. A liquid crystal display device according to claim 6, wherein the insulating film between the semiconductor layer and the capacitance line is made of $SiO_2$.

8. A liquid crystal display device according to claim 1, wherein the capacitance line has the same potential as an ON potential of the gate line.

9. A liquid crystal display device according to claim 1, wherein the capacitance line has a potential not smaller than a value obtained by adding a threshold voltage of the TFT to a maximum voltage of the drain line.

10. A liquid crystal display device according to claim 1, wherein a shielding electrode is formed to be superposed on the capacitance line in plan view with an insulating film interposed therebetween.

11. A liquid crystal display device according to claim 10, wherein the shielding electrode is one of the common electrode and the common electrode line.

12. A liquid crystal display device according to claim 1, wherein the semiconductor layer is made of polysilicon.

13. A liquid crystal display device according to claim 12, wherein the semiconductor layer is formed of one of a p-TFT and an n-TFT and is of the same type as a TFT provided outside a pixel area.

14. A liquid crystal display device according to claim 1, further comprising a backlight unit provided on a back surface of the first transparent substrate.

15. A liquid crystal display device according to claim 14, wherein the backlight unit has a luminance of not smaller than 8,000 $cd/cm^2$.

* * * * *